(12) United States Patent
Fujimoto et al.

(10) Patent No.: US 12,515,273 B2
(45) Date of Patent: Jan. 6, 2026

(54) JOINT STRUCTURE, AUTOMOTIVE COMPONENT, AND JOINT STRUCTURE MANUFACTURING METHOD

(71) Applicant: NIPPON STEEL CORPORATION, Tokyo (JP)

(72) Inventors: Hiroki Fujimoto, Tokyo (JP); Koichi Hamada, Tokyo (JP); Atsushi Ono, Tokyo (JP); Yasunori Sawa, Tokyo (JP); Toshiya Suzuki, Tokyo (JP); Tohru Okada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 1115 days.

(21) Appl. No.: 17/441,292

(22) PCT Filed: Mar. 24, 2020

(86) PCT No.: PCT/JP2020/013170
§ 371 (c)(1),
(2) Date: Sep. 21, 2021

(87) PCT Pub. No.: WO2020/196566
PCT Pub. Date: Oct. 1, 2020

(65) Prior Publication Data
US 2022/0176486 A1  Jun. 9, 2022

(30) Foreign Application Priority Data

Mar. 27, 2019  (JP) .................................. 2019-060394

(51) Int. Cl.
*B23K 11/11* (2006.01)
*B23K 11/16* (2006.01)
(Continued)

(52) U.S. Cl.
CPC ............... *B23K 11/11* (2013.01); *B23K 11/16* (2013.01); *B23K 20/12* (2013.01); *B23K 26/323* (2015.10); *F16B 5/08* (2013.01); *F16L 13/02* (2013.01)

(58) Field of Classification Search
CPC .... B21D 35/007; B21D 39/028; B23K 11/11; B23K 11/115; B23K 11/16; B23K 20/12;
(Continued)

(56) References Cited

U.S. PATENT DOCUMENTS 4,470,717 A    9/1984  Bruhnke et al.
4,738,560 A    4/1988  Brussow et al.
(Continued)

FOREIGN PATENT DOCUMENTS

CN    103085886 A    5/2013
CN    103085886 B    4/2017
(Continued)

*Primary Examiner* — Chris Q Liu
*Assistant Examiner* — James F Sims, III
(74) *Attorney, Agent, or Firm* — SOLARIS Intellectual Property Group, PLLC

(57) ABSTRACT

A joint structure includes a first sheet member, a second sheet member, a third sheet member, and plural joining parts formed at locations where the first sheet member, the second sheet member, and the third sheet member overlap, so as to join the first sheet member, the second sheet member, and the third sheet member together. The plural joining parts are formed at an interval along an edge of the first sheet member and an edge of the second sheet member. The third sheet member includes a fold-back portion provided at least between the plural joining parts by folding the third sheet member back around the edge of the first sheet member and the edge of the second sheet member such that the fold-back
(Continued)

portion is disposed on an opposite side of the first sheet member from a side overlapped with the second sheet member.

18 Claims, 34 Drawing Sheets

(51) Int. Cl.
  *B23K 20/12* (2006.01)
  *B23K 26/323* (2014.01)
  *F16B 5/08* (2006.01)
  *F16L 13/02* (2006.01)

(58) Field of Classification Search
  CPC .......... B23K 20/1265; B23K 2101/006; B23K 2103/04; B23K 2103/10; B23K 26/22; B23K 26/24; B23K 26/323; B23K 33/002; F16B 5/08; F16L 13/02
  USPC .................................................. 219/121.61
  See application file for complete search history.

(56) References Cited

U.S. PATENT DOCUMENTS

| | | | |
|---|---|---|---|
| 5,727,386 A | 3/1998 | Watanabe et al. | |
| 9,399,491 B2* | 7/2016 | Watanabe | B23K 26/22 |
| 2003/0057255 A1 | 3/2003 | Nakamura | |
| 2011/0170946 A1* | 7/2011 | Schneegans | B21D 39/021 |
| | | | 228/173.6 |
| 2013/0113237 A1 | 5/2013 | Huhn | |
| 2014/0294489 A1 | 10/2014 | Sakai | |
| 2015/0174702 A1* | 6/2015 | Fujimoto | B23K 26/32 |
| | | | 219/121.64 |
| 2017/0008124 A1* | 1/2017 | Fujimoto | B23K 26/22 |

FOREIGN PATENT DOCUMENTS

| | | |
|---|---|---|
| DE | 10048233 A1 | 4/2002 |
| EP | 0177945 A1 | 4/1986 |
| EP | 1297912 A1 | 4/2003 |
| EP | 2589525 A2 | 5/2013 |
| JP | 857-25292 A | 2/1982 |
| JP | S60-216983 A | 10/1985 |
| JP | S60-227982 A | 11/1985 |
| JP | 106-114582 A | 4/1994 |
| JP | H07-284973 A | 10/1995 |
| JP | H08-334020 A | 12/1996 |
| JP | H10-146679 A | 6/1998 |
| JP | 2003-094127 A | 4/2003 |
| JP | 2007-137217 A | 6/2007 |
| JP | 2010-115706 A | 5/2010 |
| JP | 2010-515584 A | 5/2010 |
| JP | 2012-102370 A | 5/2012 |
| JP | 2014-073722 A | 4/2014 |
| JP | 2014-188548 A | 10/2014 |
| JP | 2015-116924 A | 6/2015 |
| JP | 2017-006976 A | 1/2017 |
| JP | 2018-114969 A | 7/2018 |
| JP | 2019-116224 A | 7/2019 |
| JP | 2020-006859 A | 1/2020 |

* cited by examiner

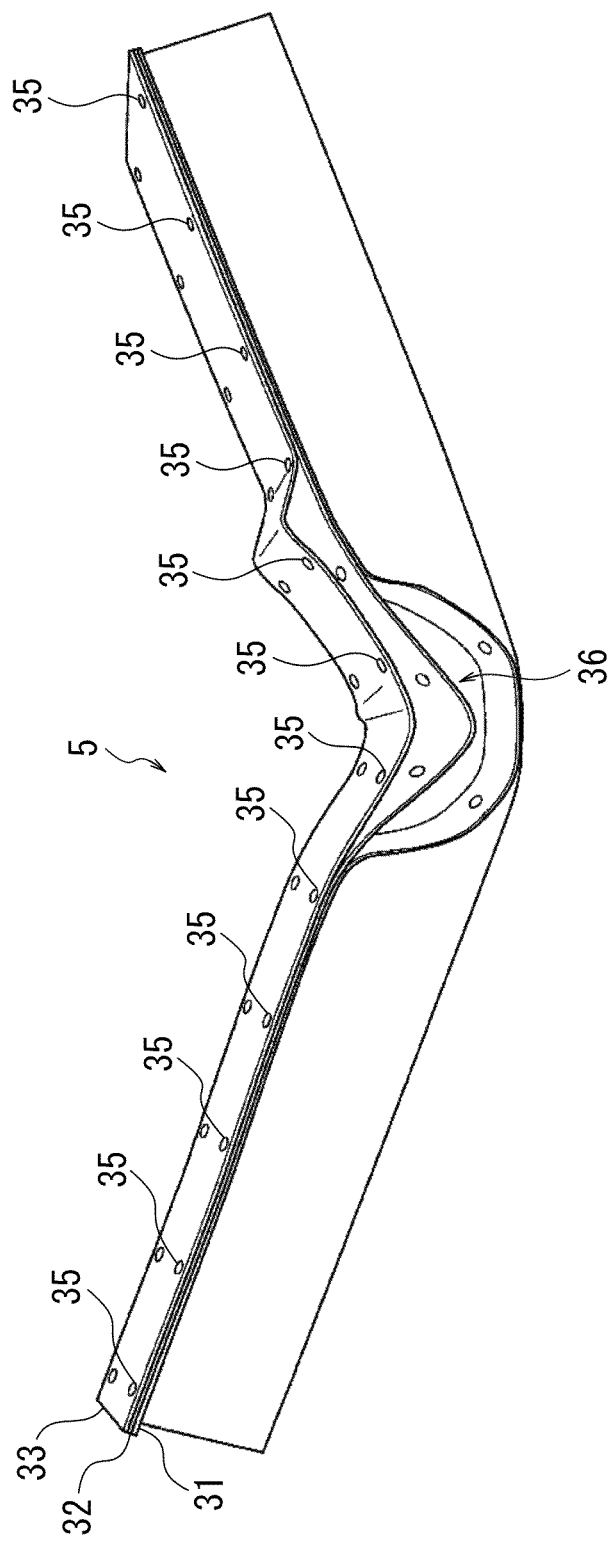

JOINT STRUCTURE, AUTOMOTIVE COMPONENT, AND JOINT STRUCTURE MANUFACTURING METHOD

CROSS-REFERENCE TO RELATED APPLICATIONS

The present application is a national stage application, under 35 U.S.C. § 371, of International Application No. PCT/JP2020/013170, filed on Mar. 24, 2020, which claims priority to Japanese Patent Application No. 2019-060394, filed on Mar. 27, 2019. The entire disclosure of each of the above applications is incorporated by reference herein.

TECHNICAL FIELD

The present invention relates to a joint structure, an automotive component, and a joint structure manufacturing method.

BACKGROUND ART

The automotive industry has been increasingly applying high-strength sheet steel in vehicle bodies in recent years in an attempt to achieve a reduction in vehicle body weight and thereby improve fuel efficiency. Increasing the strength of sheet steel configuring vehicle bodies enables the required characteristics to be obtained using sheet steel with a thinner sheet thickness, thus enabling a reduction in vehicle body weight.

However, when employing high-strength sheet steel in vehicle bodies, strength becomes more difficult to secure at joining parts between steel sheets. For example, spot welding is currently widely employed as a method of joining high-strength sheet steel employed in vehicle bodies. FIG. 1 schematically illustrates a relationship between tensile strength of sheet steel and cross tension strength (CTS) of spot welds in sheet steel. As the tensile strength of the sheet steel increases, the cross tension strength of the spot welds also increases. However, a drop in the cross tension strength is observed once the tensile strength of the sheet steel exceeds about 780 MPa. This is thought to be a result of increased nugget brittleness accompanying increased hardness of the welded metal at the spot welds.

Patent Document 1 discusses one approach to securing strength in a joining part for high-strength sheet steel. Patent Document 1 discloses sheet steel for spot welding, the sheet steel having a tensile strength of from 400 MPa to 700 MPa and being configured from a base metal with a composition containing carbon in a range of from 0.05 mass % to 0.12 mass %, a carbon equivalent Ceqt as expressed by the equation $\{Ceqt=C+Si/30+Mn/20+2P+45\}$ in a range of from 0.18 mass % to 0.22 mass %, a carbon equivalent Ceqh as expressed by the equation $\{Ceqh=C+Si/40+Cr/20\}$ of no less than 0.08 mass %, and an average oxygen concentration OC (%) in a depth range from the surface of the sheet steel to 3 μm as measured using Marcus radio frequency glow discharge optical emission spectrometry (GDS) within a range expressed by the equation $\{OC \leq 0.5\}$.

Patent Document 2 discloses a resistance spot welding method in which a sheet set configured by two or more overlapping steel sheets is sandwiched between a pair of welding electrodes and welded by passing a current while applying pressure. The method includes at least two processes, including a main energization process in which a current is applied to form a nugget of a predetermined diameter, and a post-heating energization process configured by one cycle to twenty cycles of rest periods and brief energization, while continuing to apply the same pressure as in the main energization process.

The technology disclosed in Patent Document 1 seeks to improve spot weld strength by controlling the composition and the like of the sheet steel. The technology disclosed in Patent Document 2 seeks to improve spot weld strength through the post-heating energization process. However, the technology of Patent Document 1 limits the degrees of freedom to set the composition at locations away from spot welds of the sheet steel. The technology of Patent Document 2 is solely concerned with increasing the strength of the spot weld itself, and does not give any attention to a means of increasing the overall strength of a joint structure including such a spot weld.

PATENT DOCUMENTS

Patent Document 1: Japanese Patent Application Laid-Open (JP-A) No. 2012-102370
Patent Document 2: JP-A No. 2010-115706

SUMMARY OF INVENTION

Technical Problem

An object of the present invention is to provide a joint structure that is not liable to fracture at a joining part.

Solution to Problem

An outline of the present invention is as follows.

(1) A joint structure according to a first aspect of the present invention includes a first sheet member, a second sheet member overlapped with the first sheet member in a sheet thickness direction, a third sheet member overlapped in the sheet thickness direction on an opposite side of the second sheet member from a side overlapped with the first sheet member, and plural joining parts formed at locations where the first sheet member, the second sheet member, and the third sheet member overlap, so as to join the first sheet member, the second sheet member, and the third sheet member together. The plural joining parts are formed at an interval along an edge of the first sheet member and an edge of the second sheet member. The third sheet member includes a fold-back portion provided at least between the plural joining parts by folding the third sheet member back around the edge of the first sheet member and the edge of the second sheet member such that the fold-back portion is disposed on an opposite side of the first sheet member from a side that overlaps with the second sheet member.

(2) A joint structure manufacturing method according to a second aspect of the present invention includes: overlapping a second sheet member with a first sheet member in a sheet thickness direction, and overlapping a third sheet member in the sheet thickness direction on an opposite side of the second sheet member from a side overlapped with the first sheet member; and forming plural joining parts at an interval along an edge of the first sheet member and an edge of the second sheet member at locations where the first sheet member, the second sheet member, and the third sheet member overlap so as to join the first sheet member, the second sheet member, and the third sheet member together, and forming a fold-back portion at the third sheet member at least between the plural joining parts by folding the third sheet member back around the edge of the first sheet member and the edge of the second sheet member such that the fold-back portion is disposed on an opposite side of the first sheet member from a side that overlaps with the second sheet member.

Advantageous Effects of Invention

The present invention is capable of providing a joint structure that is not liable to fracture at a joining part.

BRIEF DESCRIPTION OF DRAWINGS

FIG. 2 is a perspective view illustrating a fracturing profile of a box-shaped cross-section member manufactured by spot welding plural sheet members together when applied with three-point bending stress.

Figure 1:
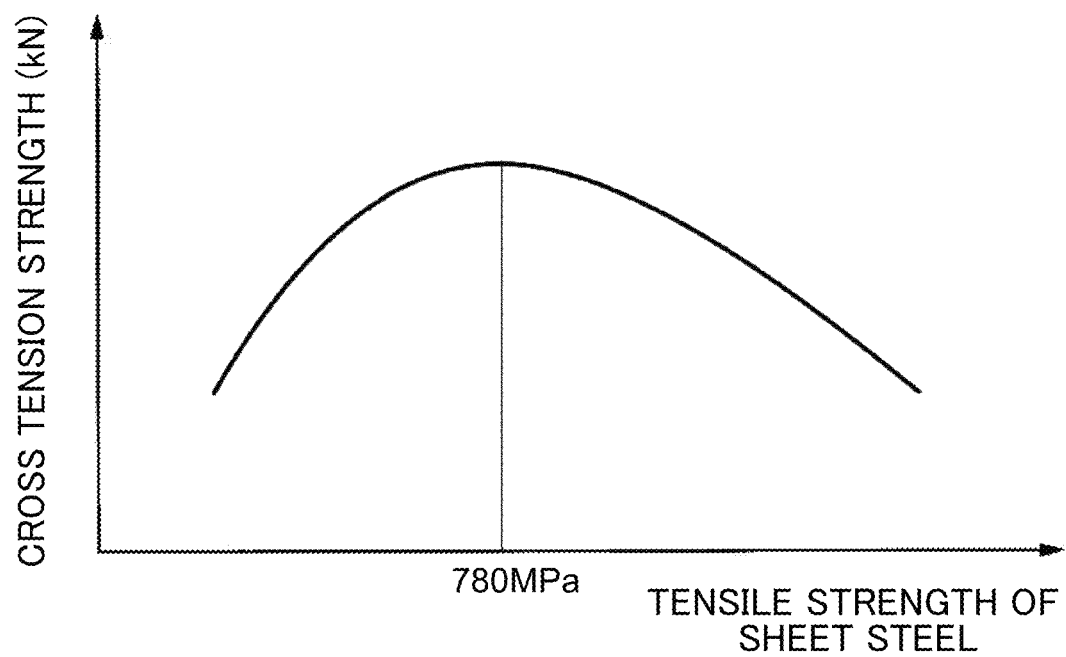
FIG. 1 is a graph schematically illustrating a relationship between tensile strength of sheet steel and cross tension strength of spot welds in sheet steel.

DESCRIPTION OF EMBODIMENTS (Findings of the Inventors)

The inventors focused on the deformation profiles of plural sheet members when joining parts between the plural sheet members fracture. In cases in which stress is applied to a structural member configured from a joint structure including plural sheet members, the plural sheet members deform before the joining parts fracture. When this occurs, openings may occur between the plural sheet members configuring the joint structure. The inventors focused on fracturing of the joining parts in the vicinity of such openings that tend to occur most readily. This is since force is thought to act on the joining parts in separating directions in the vicinity of such openings.

The inventors conceived that introducing a structure to prevent the openings from occurring at the joint structure could prevent separating direction force from acting on the joining parts, suppress fracture of the joining parts, and improve performance such as the maximum load of the structural members.

A box-shaped cross-section member is an example of a joint structure in which an opening is liable to occur. This box-shaped cross-section member is a member that is manufactured by intermittently joining edges of a hat-shaped cross-section member and a flat sheet, or of a hat-shaped cross-section member and another hat-shaped cross-section member.

FIG. 2 is a diagram illustrating a box-shaped cross-section member 5, manufactured by spot welding a hat-shaped cross-section member 31 and flat sheets 32, 33, in a fractured state having been applied with three-point bending stress. As illustrated in FIG. 2, the profiles of the hat-shaped cross-section member 31 and the flat sheets 32, 33 configuring the box-shaped cross-section member 5 deform differently when applied with bending stress. This causes an opening 36 to occur at non-joining part locations between plural joining parts 35 configuring intermittently-formed spot welds when the box-shaped cross-section member 5 is applied with bending stress. Stress arises in directions to separate the joining parts 35 at both ends of the opening 36, causing the joining parts 35 to fracture.

The inventors considered the idea of introducing a structure to a joint structure so as to prevent the opening 36 from occurring at non-joining part locations in an attempt to reduce the separating direction force acting on the joining parts 35 and thereby increase the bending strength of the box-shaped cross-section member 5 by suppressing fracturing of the joining parts 35.

The inventors carried out further investigation into means to preventing the opening 36 from occurring at non-joining part locations of the joint structure. This led the inventors to discover that the opening 36 can be efficiently prevented from occurring by the addition of a third sheet member 13 (see FIG. 3A) to a structure to prevent the opening 36.

Figure 3A:
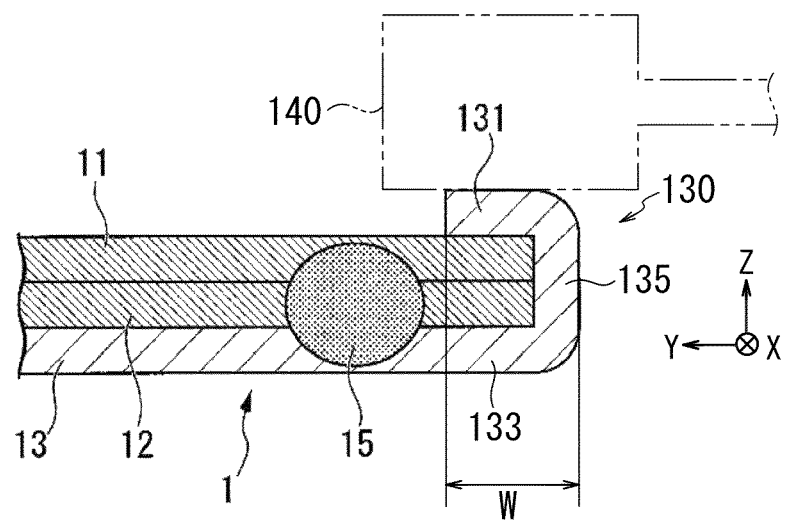
FIG. 3A is a cross-section illustrating an example of a joint structure according to an exemplary embodiment of the present invention.

Specifically, for example, as illustrated in FIG. 3A, the inventors considered accommodating an edge of a first sheet member 11 and an edge of a second sheet member 12 configuring a joint structure 1 within a fold-back structure 130 configured by folding back the third sheet member 13 in order to suppress the opening 36 (see FIG. 2) from occurring at the non-joining part locations, to suppress separating direction force from acting on joining parts 15, and thereby reduce fracturing of the joint structure 1.

The fold-back structure 130 of the third sheet member 13 is configured by a fold-back portion 131, an opposing portion 133 opposing the fold-back portion 131, and a coupling portion 135 coupling the fold-back portion 131 and the opposing portion 133 together. The fold-back portion 131 is folded back around the edge of the first sheet member 11 and the edge of the second sheet member 12, and is a portion disposed on an opposite side of the first sheet member 11 from a side overlapped with the second sheet member 12. The opposing portion 133 is a portion opposing the fold-back portion 131 across the edge of the first sheet member 11 and the edge of the second sheet member 12 in an arrow Z direction. The coupling portion 135 is a portion coupling the fold-back portion 131 and the opposing portion 133 together in the arrow Z direction.

Note that the fold-back structure 130 of the third sheet member 13 by itself has substantially no effect in terms of improving the joining part strength between the first sheet member 11 and the second sheet member 12. Simply accommodating the first sheet member 11 and the second sheet member 12 within the fold-back structure 130 of the third sheet member 13 achieves very little in the way of joining part strength. Although the fold-back structure 130 of the third sheet member 13 has an effect of preventing openings from occurring between the first sheet member 11 and the second sheet member 12 during an initial stage of deformation of the joint structure 1, the fold-back structure 130 fractures easily if a large amount of stress acts on the joint structure 1.

However, by combining the fold-back structure 130 with the joining parts 15, such as spot welds that join the first sheet member 11 and the second sheet member 12 together, separating direction force is suppressed from acting on the joining parts 15 in the initial stage of deformation of the joint structure 1, enabling a resisting force of the joining parts 15 to be exploited to its fullest extent.

Namely, the joint structure 1 according to the present exemplary embodiment reduces fracturing of the joining parts 15 through the combined effects of the joining parts 15 between the first sheet member 11 and the second sheet member 12, and of the fold-back structure 130 of the third sheet member 13.

Explanation follows regarding a specific implementation of a joint structure according to the present exemplary embodiment, developed in light of the findings described above.

(Specific Configuration of Joint Structure)

Figure 3B:
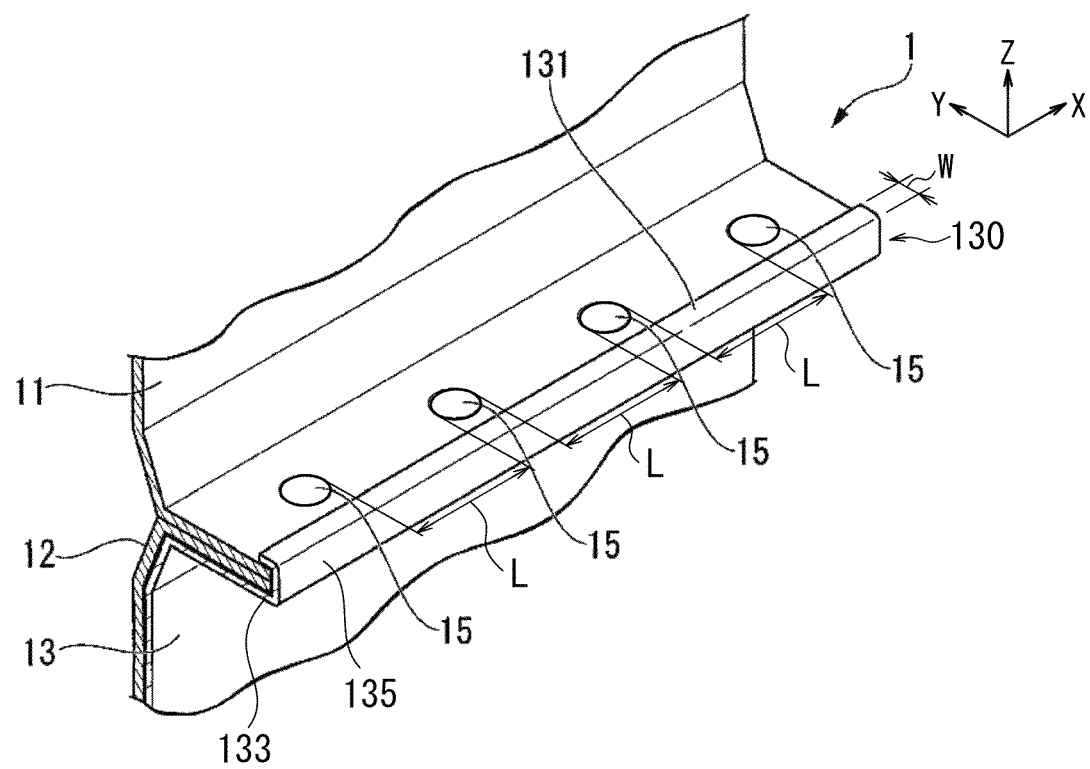
FIG. 3B is a perspective view of the joint structure illustrated in FIG. 3A.

The joint structure 1 according to the present exemplary embodiment of the present invention illustrated in FIG. 3A and FIG. 3B includes the first sheet member 11, the second sheet member 12, the third sheet member 13, and plural of the joining parts 15. The second sheet member 12 is overlapped with the first sheet member 11 in the sheet thickness direction of the second sheet member 12. The third sheet member 13 is overlapped in the sheet thickness direction of the second sheet member 12 on an opposite side of the second sheet member 12 from a side overlapped with first sheet member 11.

The arrow X direction, the arrow Y direction, and the arrow Z direction are mutually orthogonal to one another. The arrow Z direction corresponds to the sheet thickness direction of the second sheet member 12.

The plural joining parts 15 are formed at locations where the first sheet member 11, the second sheet member 12, and the third sheet member 13 overlap, so as to join the first sheet member 11, the second sheet member 12, and the third sheet member 13 together. The plural joining parts 15 are formed at intervals along the edge of the first sheet member 11 and the edge of the second sheet member 12. The arrow X direction corresponds to this direction along the edge of the first sheet member 11 and the edge of the second sheet member 12, namely corresponds to the direction in which the plural joining parts 15 are arrayed at intervals.

The third sheet member 13 includes the fold-back portion 131. The fold-back portion 131 is folded back on itself around the edge of the first sheet member 11 and the edge of the second sheet member 12 so as to be disposed on an opposite side of the first sheet member 11 from a side overlapped with the second sheet member 12, at least between the plural joining parts 15. The fold-back portion 131 is folded back around the edge of the first sheet member 11 and the edge of the second sheet member 12 at least between the plural joining parts 15 so as to include at least locations positioned within respective arrow X direction ranges L between the plural joining parts 15. The fold-back portion 131 in the following explanation includes at least such locations positioned within these respective arrow X direction ranges L between the plural joining parts 15. It is desirable for the intervals (length of L) between the plural joining parts 15 to be no shorter than a lower limit of 10 mm and no longer than an upper limit of 150 mm. Below this lower limit, the increase in the number of joining parts 15 results in increased cost, whereas above this upper limit, there is a significant deterioration in collision properties of the members. The lower limit is more preferably 15 mm or 20 mm, and the upper limit is more preferably 120 mm or 100 mm.

Obviously, there is no need for the entire edge of one or more of the sheet members configuring the plural sheet members of the joint structure 1 according to the present exemplary embodiment to be provided with the above-described configuration. Unless specifically stated, in the following explanation the term "edge" refers to an edge (joined edge) applied with a joint structure including one or both of a joining part 15 or a fold-back portion 131.

However, there is nothing to preclude one or more sheet members of the plural sheet members applied with the joint structure 1 according to the present exemplary embodiment including an edge (non-joined edge) unrelated to the joint structure.

Moreover, there is nothing to preclude the joint structure 1 from further including a joining part configured differently to that described above. Namely, a joint structure including part or all of the configuration of the joint structure 1 according to the present exemplary embodiment is still considered to correspond to the joint structure 1 according to the present exemplary embodiment.

The materials employed for the first sheet member 11, the second sheet member 12, and the third sheet member 13 are not particularly limited. For example, metal sheets such as steel sheets, aluminum sheets, or titanium sheets, or wooden sheets or resin sheets may be employed as the first sheet member 11, the second sheet member 12, and the third sheet member 13.

The first sheet member 11 and the second sheet member 12 secure the strength of the joint structure 1. Accordingly, at least one of the first sheet member 11, the second sheet member 12, or the third sheet member 13 is preferably configured from sheet steel, and one or both of the first sheet member 11 or the second sheet member 12 is preferably configured from high-strength sheet steel. As a rule, brittleness may become an issue at spot welds when high-strength sheet steel has a tensile strength of 780 MPa or higher.

However, in the joint structure 1 according to the present exemplary embodiment, separating direction force is suppressed from acting on the plural joining parts 15 by the fold-back portion 131 of the third sheet member 13 as described above, enabling issues with fracture at spot welds to be resolved. Accordingly, setting one or both of the first sheet member 11 or the second sheet member 12 with a tensile strength of 780 MPa or higher will exhibit superior characteristics over conventional joint structures.

The joint structure 1 further includes the third sheet member 13 overlapped with the first sheet member 11 and the second sheet member 12. Since the first sheet member 11 and the second sheet member 12 are considered equivalent members in the present exemplary embodiment, for ease of explanation the following explanation assumes that the third sheet member 13 is overlapped on the opposite side of the second sheet member 12 from the side overlapped the first sheet member 11. The third sheet member 13 includes the fold-back structure 130. The fold-back structure 130 is configured by the fold-back portion 131, the opposing portion 133, and the coupling portion 135 that couples the fold-back portion 131 and the opposing portion 133 together. The fold-back portion 131 is folded back around the edge of the first sheet member 11 and the edge of the second sheet member 12, and is a portion disposed on the opposite side of the first sheet member 11 from the side overlapped with the second sheet member 12. The opposing portion 133 is a portion opposing the fold-back portion 131 across the edge of the first sheet member 11 and the edge of the second sheet member 12 in the arrow Z direction. The coupling portion 135 is a portion coupling the fold-back portion 131 and the opposing portion 133 together in the arrow Z direction.

The edge of the first sheet member 11 and the edge of the second sheet member 12 are accommodated inside the fold-back structure 130, namely between the fold-back portion 131 and the opposing portion 133. The first sheet member 11 and the second sheet member 12 may be pressed together by the fold-back portion 131 and the opposing portion 133. The fold-back portion 131 prevents openings from occurring between the first sheet member 11 and the second sheet member 12, enabling delamination cracking of the joining parts 15 to be prevented.

From the perspective of easily forming the fold-back portion 131, the third sheet member 13 is preferably configured from a material having comparatively low tensile strength instead of a high-strength material. The third sheet member 13 is preferably configured by sheet steel having a tensile strength of less than 590 MPa, and more preferably a tensile strength of 270 MPa or higher but less than 390 MPa.

Figure 9:
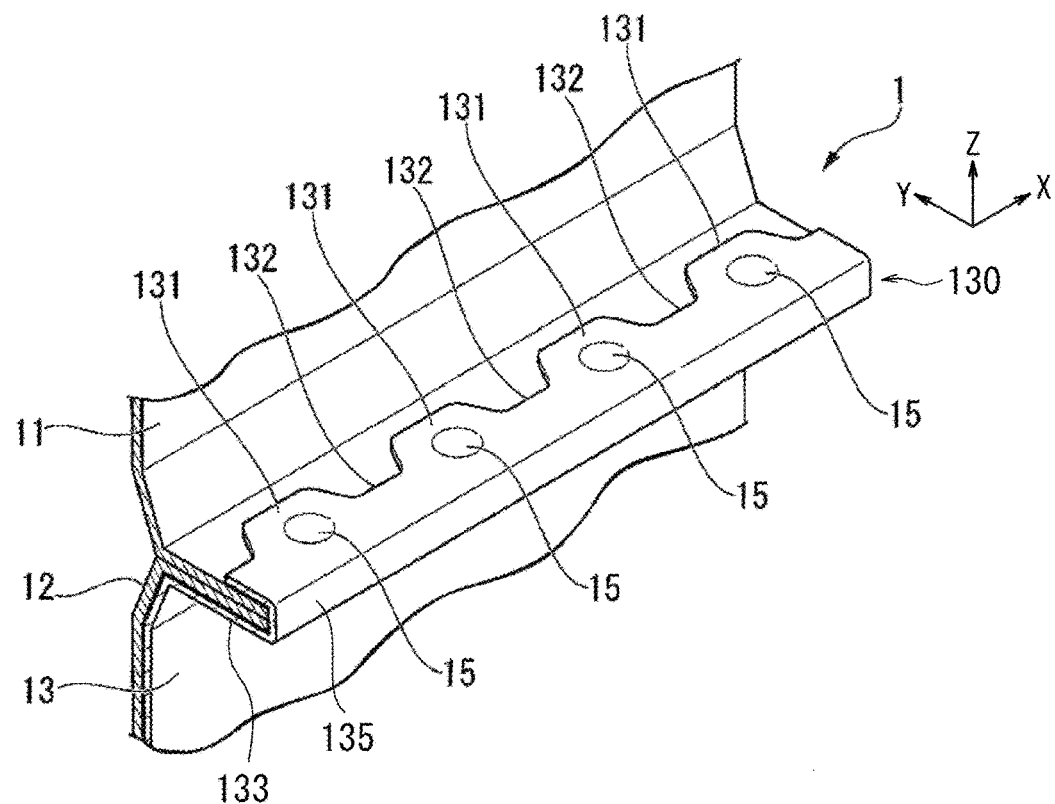
FIG. 9 is a perspective view illustrating a joint structure in which plural notches are provided between plural joining parts.

Sheet steel having a tensile strength of 270 MPa is not to what is referred to as "normal sheet steel", but interstitial free (IF) sheet steel as defined on Page 102, FIG. 9.3 of "Microstructure and Properties of Materials", the 3$^{rd}$ volume of the Handbook of Iron and Steel, 5$^{th}$ Edition, published in Japan, and is classified as a "soft sheet steel".

Note that the third sheet member 13 may be configured by an aluminum sheet.

As described above, the fold-back portion 131 of the third sheet member 13 does not increase the joining part strength of the joint structure 1 directly, but prevents openings from occurring during deformation of the joint structure 1. It is therefore sufficient that the third sheet member 13 be strong enough to prevent openings from occurring. Note that setting the width of the fold-back portion 131 as too narrow reduces the effect of suppressing openings from occurring, whereas setting the width of the fold-back portion 131 as too wide results in increased weight.

The width of the fold-back portion 131 refers to the width of the fold-back portion 131 along a direction (arrow Y direction) orthogonal to the direction (arrow X direction) running along the edge of the first sheet member 11 and the edge of the second sheet member 12 as viewed along the arrow Z direction. The width of the fold-back portion 131 is preferably from 3 mm to 25 mm. The width of the fold-back portion 131 is more preferably from 5 mm to 20 mm.

Note that the fold-back portion 131 is formed by pressing with a die or by roller hemming performed by a robot. As illustrated in FIG. 3A, roller hemming is performed by moving a roller 140 attached to a robot appendage along the edge of the first sheet member 11 and the edge of the second sheet member 12 (along the arrow X direction) while applying pressure with the roller 140 in order to form the fold-back portion 131. Roller hemming enables continuous forming of the fold-back portion 131 following the profile of the edge of the first sheet member 11 and the edge of the second sheet member 12, and enables processing with a high degree of freedom. Roller hemming is therefore more desirable than pressing.

Sheet steel with a high tensile strength exhibits a larger amount of spring-back when folding, making it more difficult to fold the sheet steel back toward itself. Folding also becomes more difficult with increasing sheet thickness.

Accordingly, it is desirable for the third sheet member 13 that is folded to be configured by sheet steel having a tensile strength of 270 MPa or higher but less than 390 MPa. Moreover, it is desirable for the tensile strength of the first sheet member 11 and the second sheet member 12 to be 440 MPa or higher but less than 2700 MPa. Below 440 MPa, structural strength becomes difficult to obtain, whereas at 2700 MPa and above, the base metal of the sheet steel is susceptible to brittle fracturing. A lower limit is preferably set to 590 MPa or higher, and is more preferably set to 780 MPa or higher. An upper limit is preferably set below 2200 MPa.

Recent requirements relating to automotive body weight reduction and collision safety improvements have led to demand for higher strength structural components, and the strength of sheet steel employed in automobiles increasing year by year. For example, in the case of side sills with a box-shaped cross-section (closed cross-section structure), sheet steel of at least 590 MPa grade is routinely employed for reinforcement, and even when a strength difference between the sheet steel employed for the inside and outside of such reinforcement is applied by ultra-high strengthening of one side, from the perspective of side-on collision performance, sheet steel of 440 MPa grade (from 400 MPa to 520 MPa) is employed as a minimum.

Moreover, it is desirable for the sheet thickness of the first sheet member 11 and the second sheet member 12 to be from 1.0 mm to 3.6 mm. Below 1.0 mm, it becomes difficult to obtain enough strength for the structure applied with the joint structure 1, whereas at 3.6 mm and above, the structure applied with the joint structure 1 becomes heavy. The sheet thickness of the first sheet member 11 and of the second sheet member 12 is preferably set with a lower limit of 1.2 mm and preferably set with an upper limit of 2.9 mm.

It is desirable for the sheet thickness of the third sheet member 13 to be from 0.5 mm to 1.4 mm. If the sheet thickness of the third sheet member 13 is thinner than 0.5 mm, the effect of preventing fracturing of the joining parts 15 is reduced, whereas if the sheet thickness of the third sheet member 13 is thicker than 1.4 mm, folding becomes difficult to perform. The sheet thickness of the third sheet member 13 is preferably at least 0.55 mm, and is more preferably at least 0.60 mm. The sheet thickness of the third sheet member 13 is preferably no greater than 1.3 mm, and more preferably no greater than 1.2 mm.

Moreover, it is desirable for the sheet thickness of the third sheet member 13 to be thinner than the sheet thickness of the first sheet member 11 and the sheet thickness of the second sheet member 12. Setting the sheet thickness of the third sheet member 13 thinner than the sheet thickness of the first sheet member 11 and the sheet thickness of the second sheet member 12 enables the fold-back portion 131 to be formed more easily than in cases in which the sheet thickness of the third sheet member 13 is equal to or greater than the sheet thickness of the first sheet member 11 and the sheet thickness of the second sheet member 12. From the perspective of easily forming the fold-back portion 131, it is desirable for the third sheet member 13 to be at least 0.2 mm thinner than both the sheet thickness of the first sheet member 11 and the sheet thickness of the second sheet member 12. It is even more desirable for the third sheet member 13 to be at least 0.4 mm thinner than both the sheet thickness of the first sheet member 11 and the sheet thickness of the second sheet member 12.

The joint structure 1 includes the plural joining parts 15. The plural joining parts 15 are formed at locations where the first sheet member 11, the second sheet member 12, and the third sheet member 13 overlap, so as to join these members together. The means by which the joining parts 15 are formed are not particularly limited, and welding such as spot welding, laser welding, or seam welding may be employed.

Moreover, one or more type of welding means selected from the group consisting of these welding methods may be employed in combination. Alternatively, any appropriate means, such as a joining means that does not require melting (for example a mechanical joining means or a friction stir spot welding means) may be employed for the joining parts 15. Examples of a mechanical joining means include blind rivets, self-piercing rivets (SPR), hollow rivets, flat rivets, drilling screws, bolts, resistance element welding, element arc welding, EJOWELD (registered trademark), FDS (registered trademark), and so on.

The friction stir spot welding (FSSW) means is a solid-phase joining technique in which a rotating tool that is relatively harder than a base metal is pressed against the base metal while rotating to form a join without melting the base metal.

The joint structure 1 is provided with plural of the joining parts 15, and there is nothing to preclude employing a combination of two or more types of joining parts 15, namely joining parts 15 configured by welds and joining parts 15 configured by a joining means that does not require melting, in a single joint structure 1.

The plural joining parts 15 may be configured by one or more type selected from the group consisting of a mechanical joining means, a friction stir spot welding means, a spot weld, a seam weld, and a laser weld.

Accordingly, in cases in which the plural joining parts 15 that join the first sheet member 11, the second sheet member 12, and the third sheet member 13 together are configured by one or more type selected from the group consisting of a mechanical joining means, a friction stir spot welding means, a spot weld, a seam weld, and a laser weld, adhesion locations configured by a joining part between the first sheet member 11 and the second sheet member 12 and adhesion locations where the first sheet member 11 and the second sheet member 12 are adhered to the third sheet member 13 do not correspond to the joining parts 15.

The plural joining parts 15 are formed at intervals along the edge of the first sheet member 11 and the edge of the second sheet member 12. Spot welds are an example of these plural joining parts 15. For example, cases in which the plural joining parts 15 are formed intermittently by resistance spot welding (spot welding) are preferable since such an approach enables the process of forming the plural joining parts 15 to be completed in a short period of time.

In conventional joint structures, in cases in which plural joining parts 15 are provided intermittently, when bending stress is applied to the joint structure, openings are liable to occur between the first sheet member 11 and the second sheet member 12 at the non-joining part locations between the plural joining parts 15, this promoting delamination cracking of the joining parts 15.

However, in the joint structure 1 according to the present exemplary embodiment, the fold-back portion 131 is provided to suppress openings from occurring, thereby enabling delamination cracking of the joining parts 15 to be suppressed. Accordingly providing the plural joining parts 15 intermittently enables superior characteristics over conventional joint structures to be exhibited.

Figures 27A, 27B:
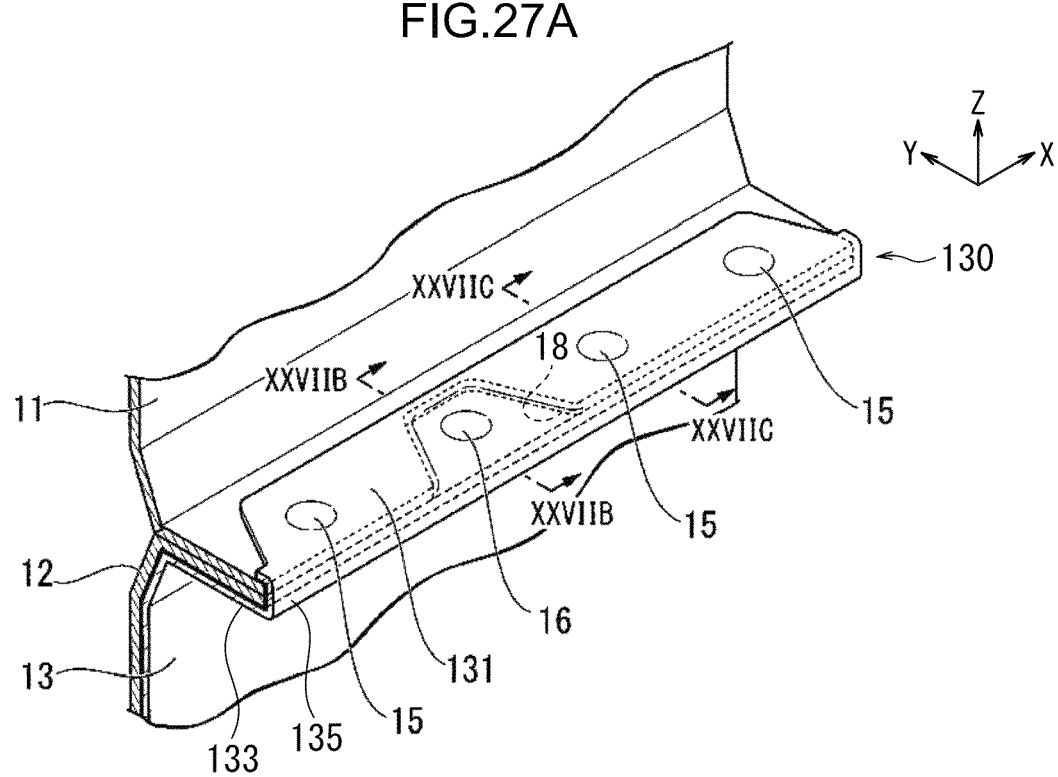
FIG. 27A is a perspective view illustrating a joint structure including an additional joining part that joins an opposing portion, a second sheet member, and a fold-back portion together, and that does not join a first sheet member and the second sheet member together.
FIG. 27B is a cross-section of the joint structure illustrated in FIG. 27A as sectioned along XXVIIB-XXVIIB.
Figure 27C:
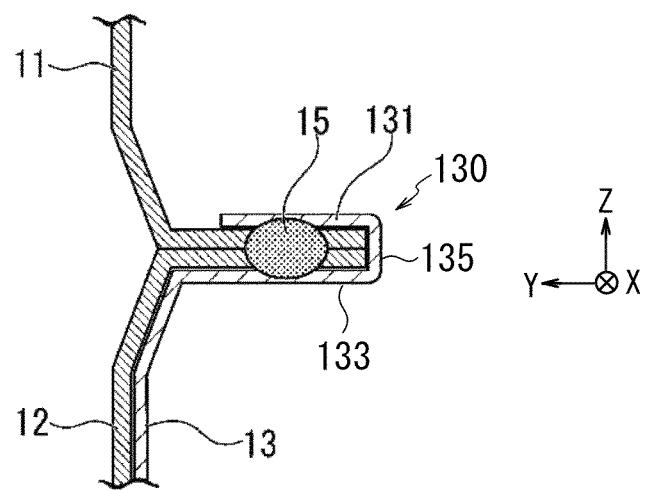
FIG. 27C is a cross-section of the joint structure illustrated in FIG. 27A as sectioned along XXVIIC-XXVIIC.
Figure 28A:
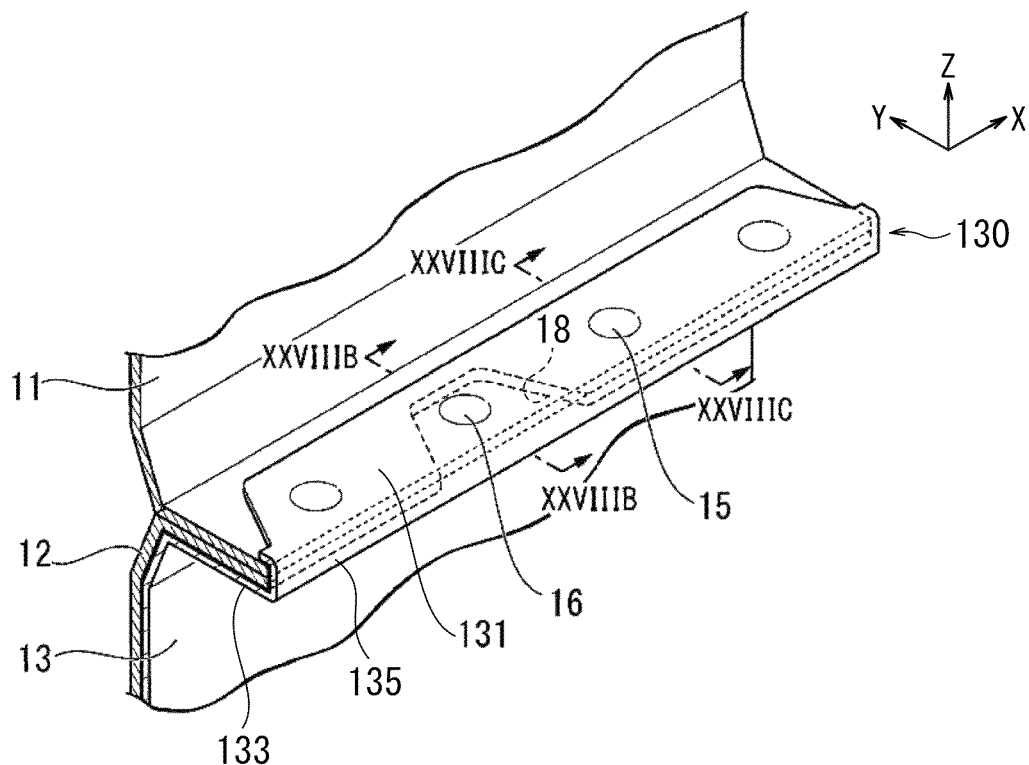
FIG. 28A is a perspective view illustrating a joint structure including an additional joining part that joins an opposing portion, a first sheet member, and a fold-back portion together, and that does not join the first sheet member and a second sheet member together.

Note that as illustrated in the examples of FIG. 27A and FIG. 28A, described later, the edge of the first sheet member 11 and the edge of the second sheet member 12 are not always straight. In such cases, the plural joining parts 15 may be provided so as to follow the crease of the fold-back portion 131. The crease of the fold-back portion 131 may be considered substantially synonymous with the edge of the first sheet member 11 and the edge of the second sheet member 12.

The fold-back portion 131 described above is provided at least between the plural joining parts 15. This enables the openings that are liable to occur between the plural joining parts 15 to be effectively prevented.

However, it is not necessary to provide the fold-back portion 131 between each of the plural joining parts 15. As in the joint structure 1 illustrated in the example of FIG. 12, described later, configuration may be such that the fold-back portion 131 is not provided between some of the joining parts 15 of the plural joining parts 15. The fold-back portion 131 may be formed at a location of the joint structure 1 where deformation occurs more readily in order to focus on preventing fracturing at this particular location, and the fold-back portion 131 may be absent from locations that do not deform readily.

Moreover, there is obviously nothing to preclude providing the fold-back portion 131 at locations overlapping with the joining parts 15 when the joint structure 1 is viewed along the arrow Z direction. So doing obtains an effect of preventing sputtering of molten metal during welding, described later.

Figure 4:
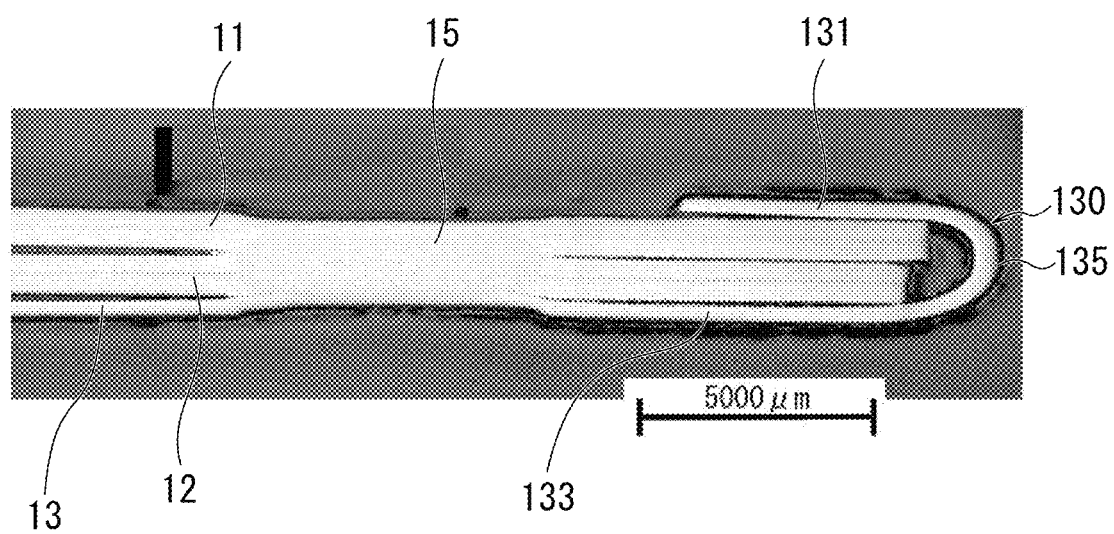
FIG. 4 is a cross-section photograph of a joint structure having the configuration illustrated in FIG. 3A.

As illustrated in FIG. 3A, FIG. 3B, and FIG. 4, the plural joining parts 15 may be disposed at positions away from regions overlapping with the fold-back portion 131 as viewed along the arrow Z direction.

In the examples illustrated in FIG. 3A, FIG. 3B, and FIG. 4, the plural joining parts 15 are disposed at positions offset in the arrow Y direction with respect to the fold-back portion 131 as viewed along the arrow Z direction. Namely, the plural joining parts 15 may be disposed outside a width range W of the fold-back portion 131.

On the other hand, as with the examples illustrated in FIG. 3C, FIG. 5A, FIG. 5B, and FIG. 6, the plural joining parts 15 may be provided overlapping with the fold-back portions 131 as viewed along the arrow Z direction. Namely, each of the plural joining parts 15 may be disposed inside the width range W of the fold-back portion 131.

Setting the width of the fold-back portion 131 such that each of the plural joining parts 15 is contained within the width range W of the fold-back portion 131 in this manner enables openings to be prevented from occurring between the first sheet member 11 and the second sheet member 12 by the fold-back portion 131, enabling the effect of preventing delamination cracking of the plural joining parts 15 to be enhanced.

Figure 5A:
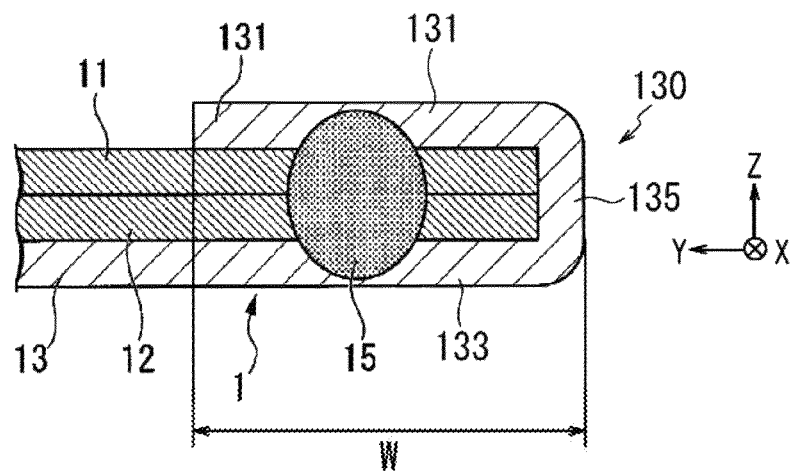
FIG. 5A is a cross-section illustrating an example of a joint structure according to another exemplary embodiment of the present invention.
Figure 5B:
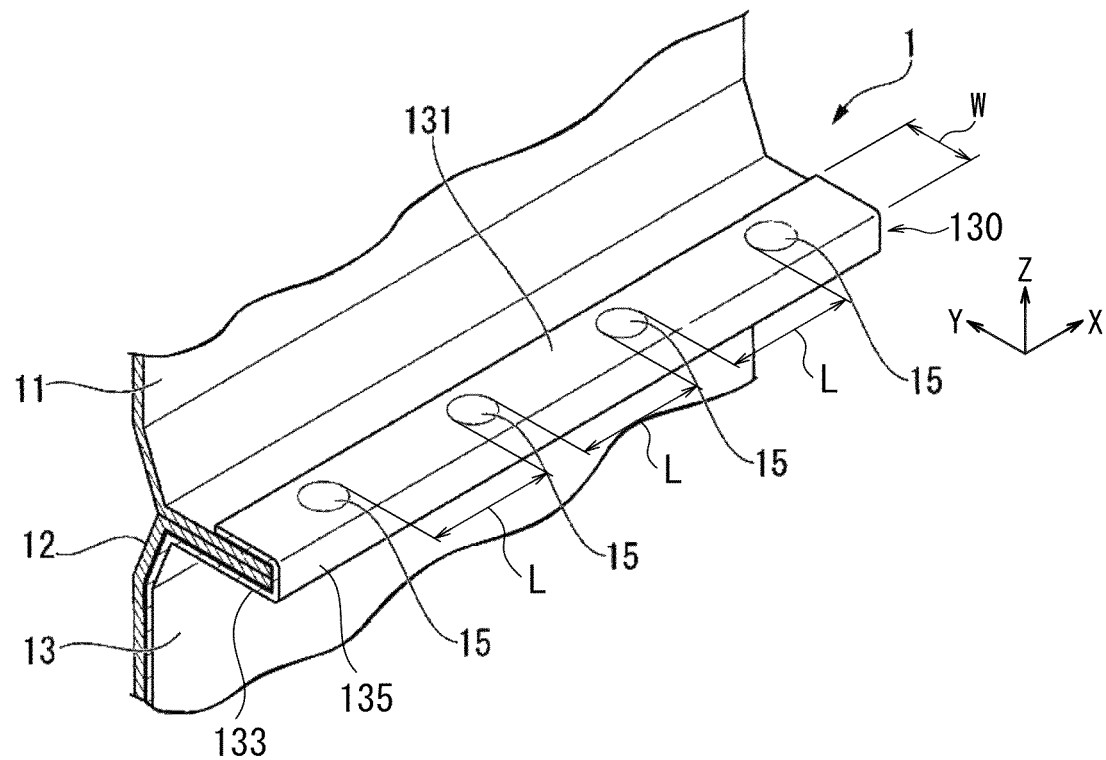
FIG. 5B is a perspective view of the joint structure illustrated in FIG. 5A.
Figure 6:
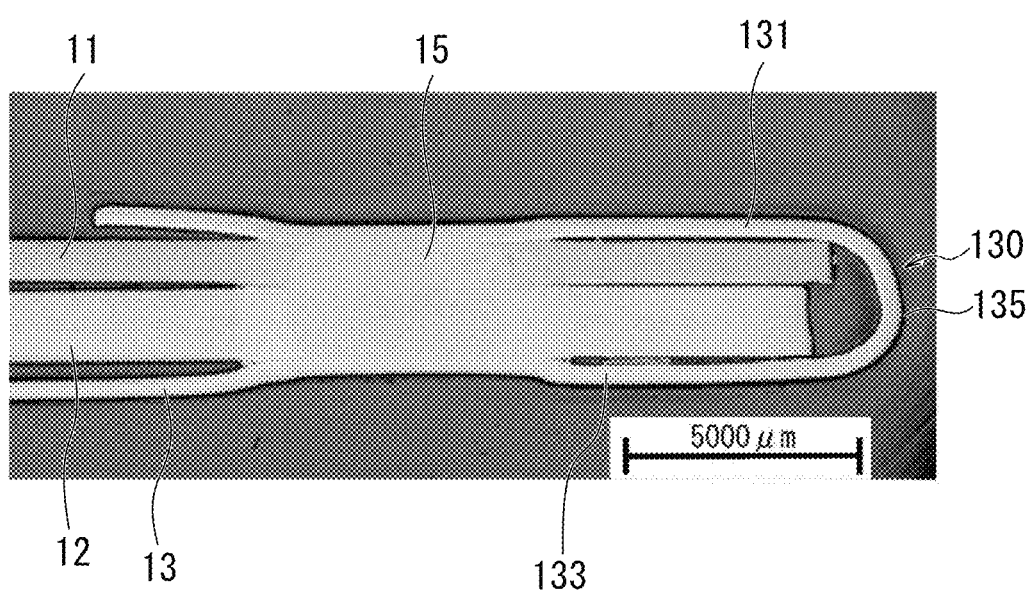
FIG. 6 is a cross-section photograph of a joint structure having the configuration illustrated in FIG. 5A.

In cases in which the plural joining parts 15 overlap with the fold-back portion 131 as viewed along the arrow Z direction, the plural joining parts 15 may or may not also join the fold-back portion 131. For example, FIG. 5A, FIG. 5B, and FIG. 6 illustrate a configuration in which the plural joining parts 15 overlap with the fold-back portion 131, and join the fold-back portion 131 and the first sheet member 11 together.

Figure 3C:
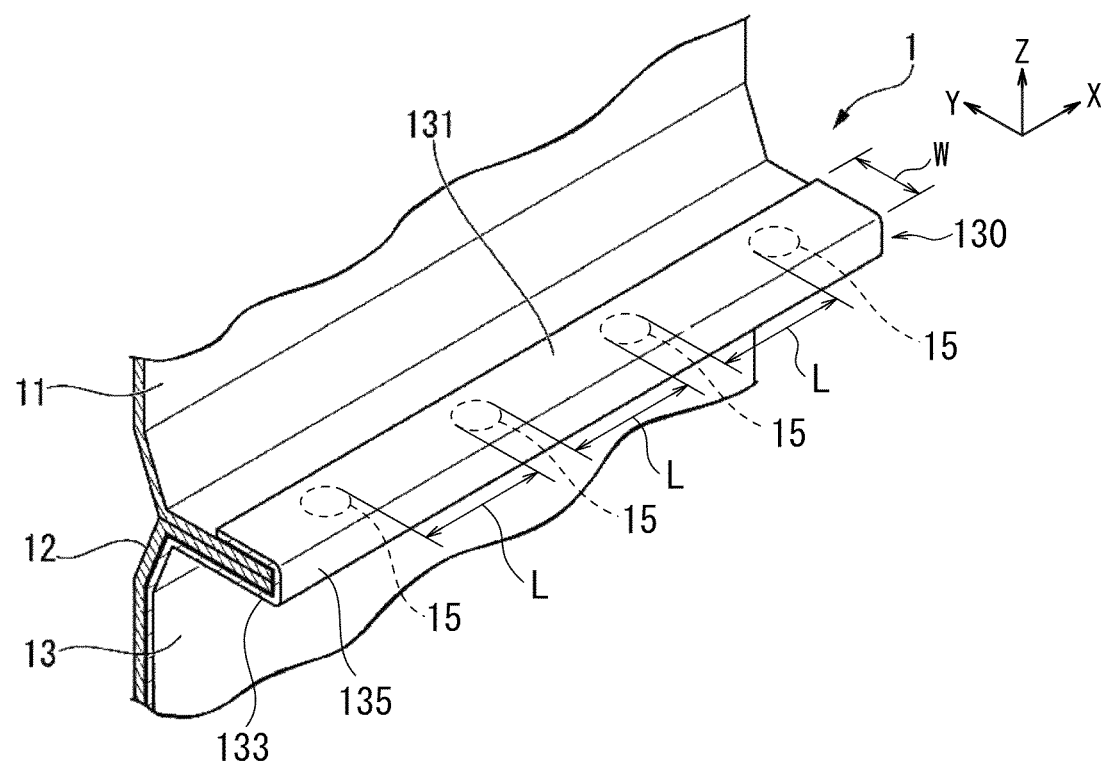
FIG. 3C is a perspective view illustrating another example of a joint structure according to an exemplary embodiment of the present invention.

On the other hand, FIG. 3C illustrates a configuration in which the plural joining parts 15 overlap with the fold-back portion 131 as viewed along the arrow Z direction, but do not join the fold-back portion 131 and the first sheet member 11 together. In either case, the fold-back portion 131 is capable of preventing openings from occurring between the first sheet member 11 and the second sheet member 12, enabling delamination cracking of the plural joining parts 15 to be prevented.

In cases in which the plural joining parts 15 overlap with the fold-back portion 131 as viewed along the arrow Z direction, and the fold-back portion 131 and the first sheet member 11 are also joined together, the joining part strength of the plural joining parts 15 is further enhanced.

On the other hand, in cases in which the width of the fold-back portion 131 is set such that the plural joining parts 15 are disposed at positions offset in the arrow Y direction with respect to the fold-back portion 131 as viewed along the arrow Z direction, the width of the fold-back portion 131 can be reduced, this being advantageous from the perspective of reducing both weight and material costs.

Note that in the cross-section illustrated in FIG. 3A and so on, the edge of the first sheet member 11 and the edge of the second sheet member 12 are aligned with each other. However, as in the cross-section photographs of FIG. 4 and FIG. 6, the edge of the first sheet member 11 and the edge of the second sheet member 12 do not have to be aligned. This is since the fold-back portion 131 is capable of preventing delamination cracking of the joining parts 15 even in cases in which the edges are not aligned. For example, the misalignment between the edge of the first sheet member 11 and the edge of the second sheet member 12 may be up to 5 mm, up to 3 mm, or up to 2 mm.

In the cross-section illustrated in FIG. 3A and so on, there are no gaps present between the edge of the first sheet member 11 and the edge of the second sheet member 12 and the fold-back portion 131 and the opposing portion 133. However, as in the cross-section photographs illustrated in FIG. 4 and FIG. 6, gaps may be present in the vicinity of the edge of the first sheet member 11 and the edge of the second sheet member 12. The fold-back portion 131 is capable of preventing delamination cracking of the joining parts 15, even in cases in which gaps are present at the edges.

Moreover, in the cross-section illustrated in FIG. 3A and so on, there is no gap present between the fold-back portion 131 and the first sheet member 11. However, as in the cross-section photographs illustrated in FIG. 4 and FIG. 6, a slight gap may be present between the fold-back portion 131 and the first sheet member 11. For example, although a slight gap is sometimes formed between a leading end of the fold-back portion 131 and the first sheet member 11 due to spring-back (a phenomenon wherein a bent location deforms so as to return somewhat toward its original profile), such a small gap is permissible. Although such gaps may vary from place to place at locations of the fold-back portion 131 where the joining parts 15 are not present, it is desirable for an uppermost limit for parts where such small gaps are present in cross-section to be set to 1.0 mm, more preferably for this uppermost limit to be set to 0.5 mm, and most preferably for this uppermost limit to be set to 0.3 mm.

(Joint Structure Manufacturing Method)

Figure 7:
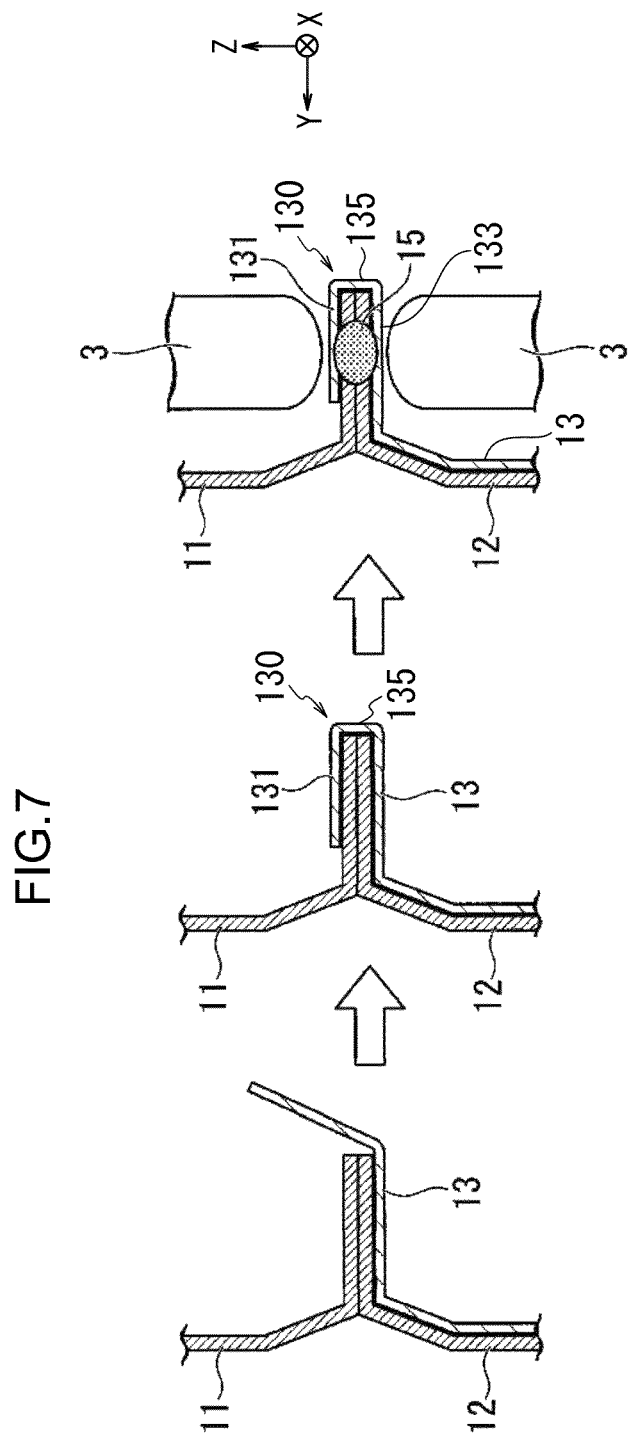
FIG. 7 is a schematic diagram illustrating an example of a joint structure manufacturing method according to an exemplary embodiment of the present invention.

Manufacturing methods for the joint structure 1 described above are not particularly limited. FIG. 7 illustrates one preferable example of a manufacturing method of the joint structure 1, this manufacturing method including:

(1) A process of overlapping the first sheet member 11, the second sheet member 12, and the third sheet member 13 (an overlapping process);

(2) A process of folding the third sheet member 13 back to form the fold-back portion 131 (a fold-back process); and (3) A process of joining the first sheet member 11, the second sheet member 12, and the third sheet member 13 together (a joining process).

In the fold-back process, as described with reference to FIG. 3A, the fold-back portion 131 may be formed by moving the roller 140 along the edge of the first sheet member 11 and the edge of the second sheet member 12 while applying pressure with the roller 140.

In the joining process illustrated in FIG. 7, spot welding electrodes 3 are disposed at positions overlapping the fold-back portion 131 as viewed along the arrow Z direction. Alternatively, the electrodes 3 may be disposed at positions offset in the arrow Y direction with respect to the fold-back portion 131 as viewed along the arrow Z direction.

In cases in which the electrodes 3 are disposed at positions overlapping the fold-back portion 131 as viewed along the arrow Z direction, in the joining process the fold-back portion 131 is joined to the first sheet member 11, the second sheet member 12, and the opposing portion 133 to obtain joining parts 15 such as those illustrated in FIG. 5A, FIG. 5B, and FIG. 6.

On the other hand, in cases in which the electrodes 3 are disposed at positions offset in the arrow Y direction with respect to the fold-back portion 131 as viewed along the arrow Z direction, the fold-back portion 131 is not joined to the first sheet member 11, the second sheet member 12, or the opposing portion 133, thereby obtaining joining parts 15 such as those illustrated in FIG. 3A, FIG. 3B, and FIG. 4.

Figure 8:
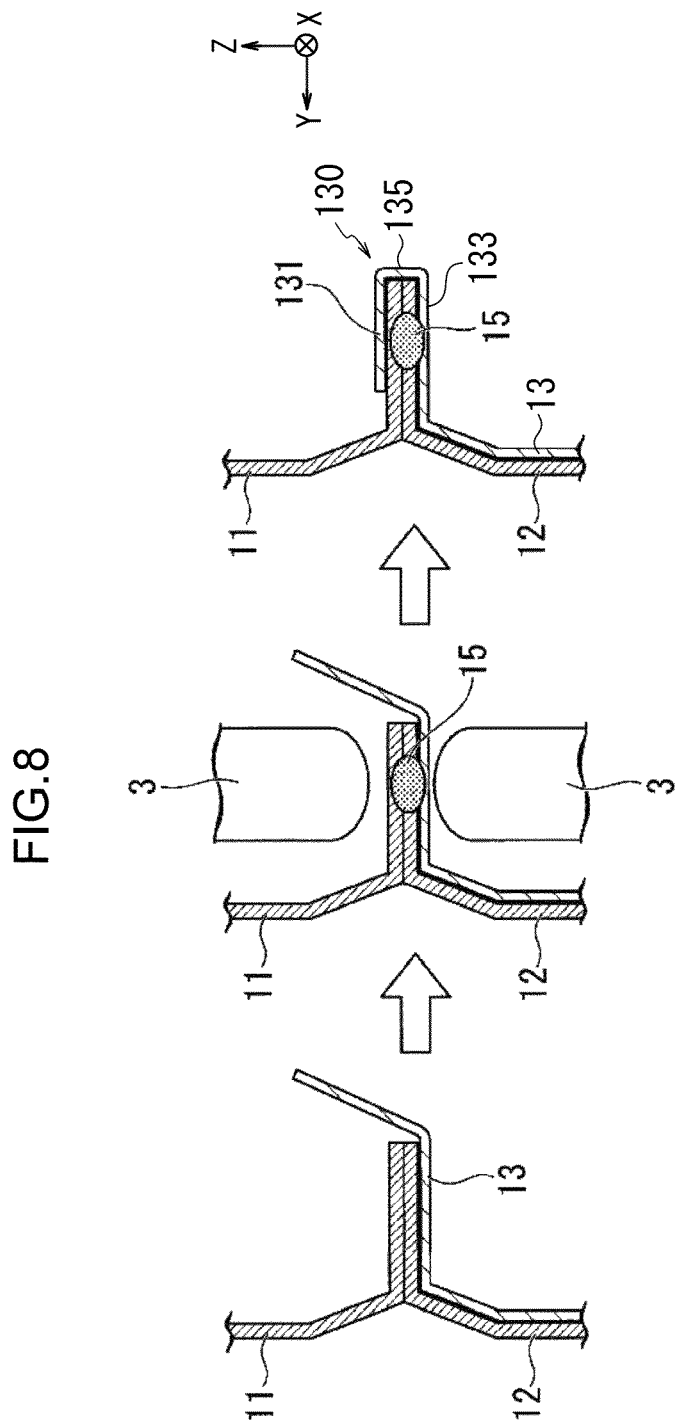
FIG. 8 is a schematic diagram illustrating another example of a joint structure manufacturing method according to an exemplary embodiment of the present invention.

As another example of a manufacturing method of the joint structure 1, as illustrated in FIG. 8, the joining process (3) is performed between the overlapping process (1) and the fold-back process (2). In such cases, joining parts 15 such as those illustrated in FIG. 3C join the first sheet member 11, the second sheet member 12, and the opposing portion 133 together, whereas the first sheet member 11 and the fold-back portion 131 are not joined together.

(Other Manufacturing Methods)

The configuration of the joining parts 15 may employ any of the examples described above. Moreover, by combining plural types of joining processes as appropriate, a single joint structure 1 may be formed with plural different types of joining parts 15. Namely, the configurations described above may be applied to some or all of the plural joining parts 15 included in the joint structure 1. From the perspective of preventing delamination cracking of the joint structure 1, joining the first sheet member 11, the second sheet member 12, the fold-back portion 131, and the opposing portion 133 together is the most advantageous configuration. However, configurations in which the first sheet member 11 and the fold-back portion 131 are not joined together due to the manufacturing equipment employed, such as illustrated in FIG. 8, are also permissible.

Note that as illustrated in FIG. 7, if the fold-back portion 131 is formed prior to the joining process (3), the fold-back portion 131 exhibits an advantageous effect of preventing sputtering of molten metal during spot welding.

Sputtering of molten metal is an issue that is typically liable to arise when spot welding high-strength sheet steel. Molten metal sputter adhering to an outer face of a structure can be a cause of painting flaws or unsightly appearance. Providing a process to remove molten metal sputter as part of the structure manufacturing method results in an increase in the number of structure manufacturing processes.

However, in the joint structure 1 according to the present exemplary embodiment, the fold-back portion 131 that covers the edge of the first sheet member 11 and the edge of the second sheet member 12 prevents molten metal sputter during welding.

Moreover, in cases in which the first sheet member 11 is configured by hard sheet steel such as hot stamped sheet steel, were direct current spot welding to be performed without the fold-back portion 131 being present, the spot welding electrode would make direct contact with the hard first sheet member 11. This would result in increased current density at the contact face, which could cause molten metal sputter from the surface of the contact face during welding.

However, by disposing the fold-back portion 131 formed at the third sheet member 13 configured by soft sheet steel so as to make contact with the electrode, the electrode is able to bite into the fold-back portion 131 configured from soft sheet steel, thereby increasing the contact surface area between the fold-back portion 131 and the electrode, reducing the current density at the contact face and thereby enabling the occurrence of molten metal sputter from the surface of the contact face to be suppressed.

There is nothing to preclude joining the first sheet member 11, the second sheet member 12, and the third sheet member 13 together using a combination of plural joining means. For example, the first sheet member 11, the second sheet member 12, and the third sheet member 13 may be additionally adhered using a joining means (such as an adhesive) separately to the joining means employed for the joining parts 15 (such as spot welding, laser welding, or seam welding).

Figure 24:
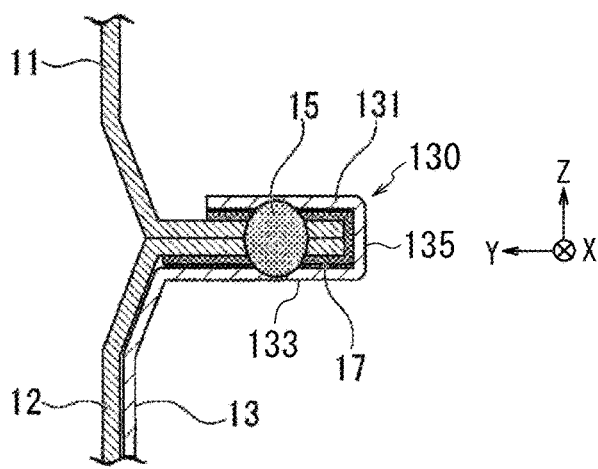
FIG. 24 is a cross-section illustrating a joint structure in which an adhesive is used to adhere between an opposing portion of a third sheet member and second sheet member, and between a fold-back portion and a first sheet member.

In the joint structure 1 illustrated in FIG. 24, an additional adhesive 17 serving as a joining means separate to the joining parts 15 is employed to adhere between the opposing portion 133 of the third sheet member 13 and the second sheet member 12, and between the fold-back portion 131 and the first sheet member 11. In cases in which such adhesion using the adhesive 17 is performed between the plural joining parts 15, a particularly evident advantageous effect of preventing openings from occurring is exhibited.

Figure 25:
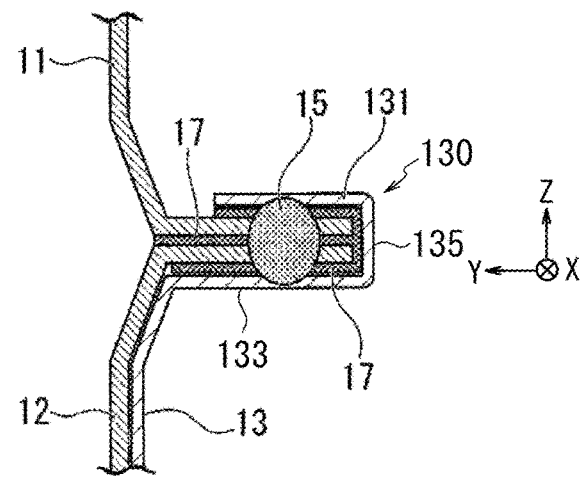
FIG. 25 is a cross-section illustrating a joint structure in which an adhesive is used to adhere between a first sheet member and a second sheet member.

Note that in cases in which joining by welding and joining using an adhesive are employed in combination, adhesive is preferably not used to adhere between the first sheet member 11 and the second sheet member 12. Namely, the joining parts 15 should not be configured by welds in a configuration such as that illustrated in FIG. 25 in which the adhesive 17 serving as a joining means separate to the joining parts 15 is used to adhere between the first sheet member 11 and the second sheet member 12 as well as between the opposing portion 133 of the third sheet member 13 and the second sheet member 12, and between the fold-back portion 131 and the first sheet member 11. This is to suppress the possibility of explosive spattering occurring during welding.

Explosive spattering in lap resistance welding is normally understood to be a phenomenon occurring in which the weld is overheated due to excessive welding conditions, causing explosive spattering and holes at the weld to occur.

However, in cases in which an adhesive is applied at the location to be welded, the adhesive may instantaneously vaporize during welding, causing explosive spattering to occur at the weld even without excessive welding conditions, and potentially creating a hole at the weld. Moreover, since the interface between the first sheet member 11 and the second sheet member 12 is positioned at the center or close to the center of the metals to be welded, there is a strong possibility that the adhesive applied at the interface may generate explosive spattering.

Accordingly, it is desirable for any adhesive applied to at least be spaced apart from the welds between the first sheet member 11 and the second sheet member 12, and more desirable not to use adhesive to adhere between the first sheet member 11 and the second sheet member 12. This enables even more stable weld quality to be achieved.

On the other hand, at the interface between the second sheet member 12 and the opposing portion 133 of the third sheet member 13 and at the interface between the first sheet member 11 and the fold-back portion 131, there is no need to keep the welds and the adhesive spaced apart from each other. Since these interfaces are a short distance from the interfaces with the spot welding electrodes, and the pressure applied by the electrodes easily removes the adhesive, the possibility of explosive spattering occurring is relatively low even if adhesive is applied at these interfaces.

Accordingly, in the joint structure 1 illustrated in FIG. 24, problems would not usually be anticipated even when the joining parts 15 are configured by spot welds.

However, in cases in which it is necessary to manufacture the joint structure 1 under welding conditions including a high current density, there may be cases in which it is advisable to keep the spot welds and adhesive spaced apart from each other at the interface between the second sheet member 12 and the opposing portion 133 of the third sheet member 13 and at the interface between the first sheet member 11 and the fold-back portion 131.

Moreover, in cases in which the joining parts 15 are configured by a mechanical joining means, or a joining means that does not require melting such as a friction stir spot welding means, there is no need to consider the problem of explosive spattering, and therefore no need to limit the use of adhesive. In the joint structure 1 illustrated in FIG. 25, the joining parts 15 are preferably configured by a joining means that does not require melting.

The fold-back portion 131 may also be beneficially provided with notches 132 as appropriate. FIG. 9 illustrates an example of a configuration utilizing such notches 132, in which plural of the joining parts 15 are formed at intervals in a direction along the edge of the first sheet member 11 and the edge of the second sheet member 12 (along the arrow X direction), and an edge of the fold-back portion 131 is provided with plural of the notches 132 between the plural joining parts 15 as viewed along the arrow Z direction.

In other words, the fold-back portion 131 may extend to a greater width in the arrow Y direction at the positions of the respective joining parts 15 so as to overlap with the respective joining parts 15 in the arrow Z direction, and extend to a narrower width in the arrow Y direction between the plural joining parts 15.

This further increases the strength of the plural joining parts 15 against delamination, while also enabling a reduction in both weight and material costs of the joint structure 1.

In the example illustrated in FIG. 9, the fold-back portion 131 is formed with plural of the notches 132 at intervals along the edge of the first sheet member 11 and the edge of the second sheet member 12. Alternatively, the fold-back portion 131 may be formed with a single notch 132.

Figure 10:
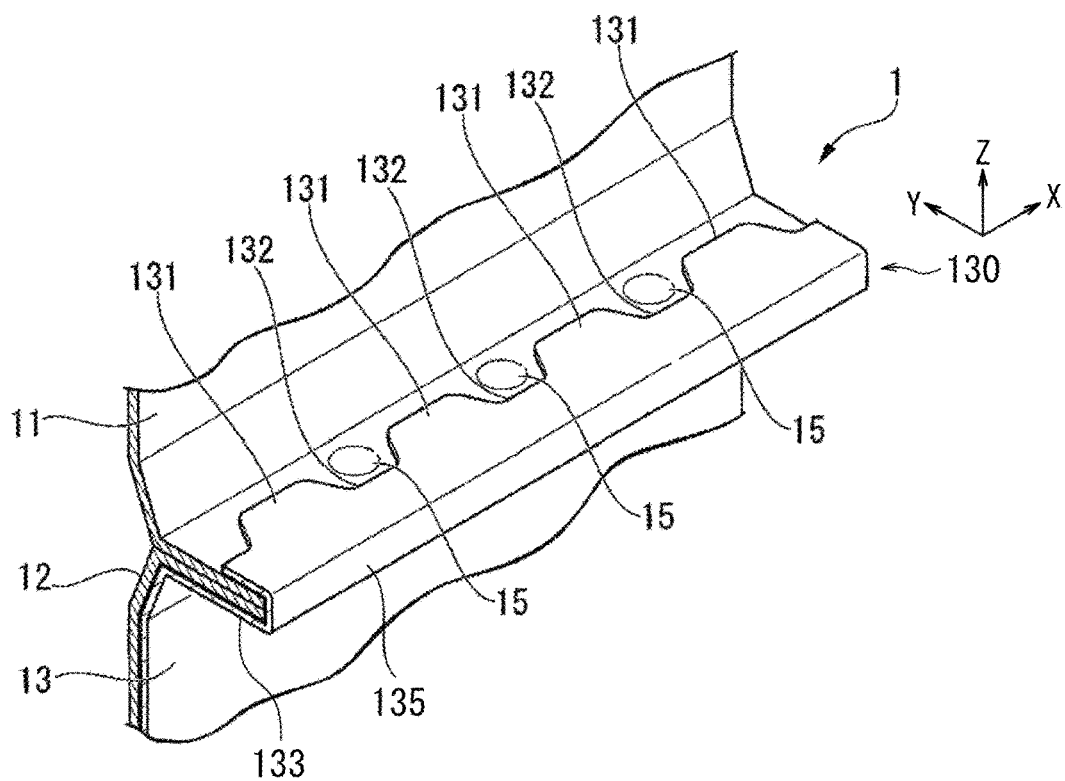
FIG. 10 is a perspective view illustrating a joint structure in which plural notches are provided at positions overlapping plural joining parts.

FIG. 10 illustrates another example of a configuration utilizing the notches 132, in which plural of the joining parts 15 are formed at intervals in a direction along the edge of the first sheet member 11 and the edge of the second sheet member 12 (along the arrow X direction), and the edge of the fold-back portion 131 includes plural notches 132 at positions overlapping the plural joining parts 15 as viewed along the arrow Z direction.

In other words, the fold-back portion 131 may extend to a greater width in the arrow Y direction between the plural joining parts 15, and extend to a narrower width at the positions of the plural joining parts 15 so as not to overlap with the joining parts 15 in the arrow Z direction (so as to be offset in the arrow Y direction). In this configuration, the joining parts 15 disposed inside the notches 132 as viewed along the arrow Z direction do not join the first sheet member 11 and the fold-back portion 131 together.

This configuration enables a reduction in the weight of the joint structure 1 while preventing openings from occurring at non-joining part locations between the plural joining parts 15.

In the example illustrated in FIG. 10, the fold-back portion 131 is formed with plural of the notches 132 at intervals along the edge of the first sheet member 11 and the edge of the second sheet member 12. Alternatively, the fold-back portion 131 may be formed with a single notch 132.

Figure 11:
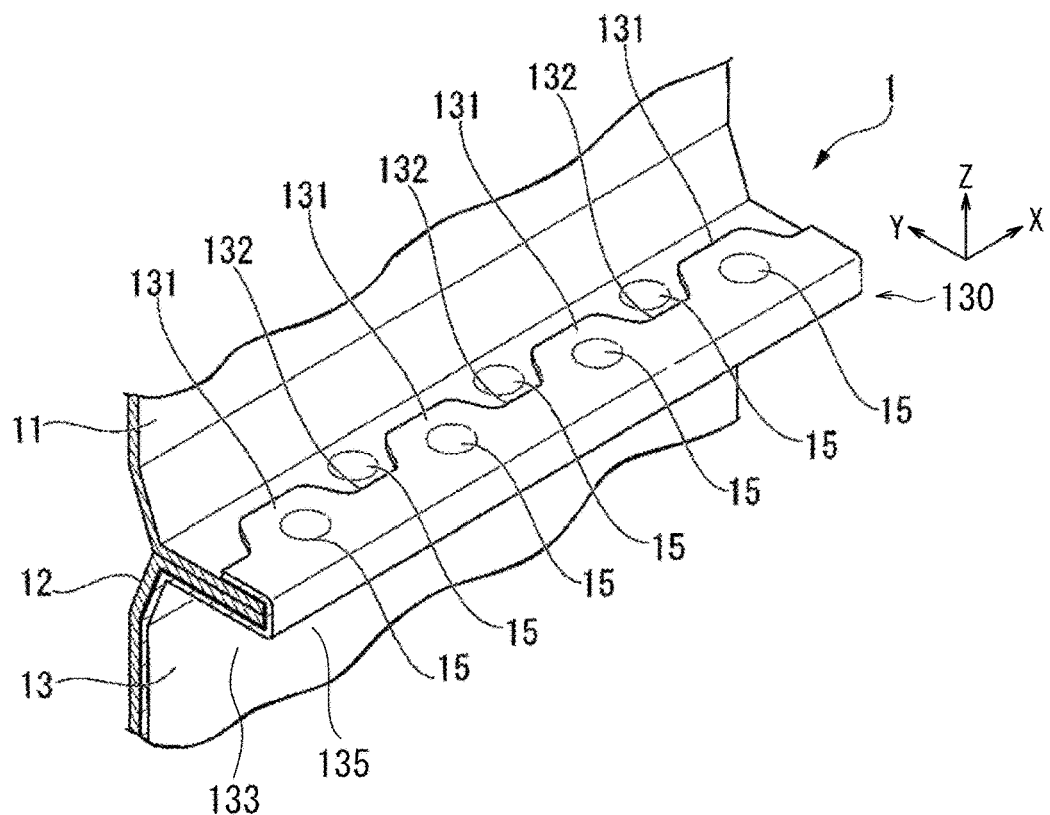
FIG. 11 is a perspective view illustrating a joint structure in which plural notches are provided at positions overlapping some joining parts of plural joining parts.

Moreover, the configuration in FIG. 9 and the configuration in FIG. 10 may be combined. Namely, FIG. 11 illustrates an example in which the edge of the fold-back portion 131 of the third sheet member 13 includes plural notches 132 formed at intervals along the edge of the first sheet member 11 and the edge of the second sheet member 12 at positions overlapping some joining parts 15 of the plural joining parts 15 as viewed along the arrow Z direction. Such a configuration enables a reduction in the weight of the joint structure 1 while preventing openings from occurring at non-joining part locations between the plural joining parts 15.

Moreover, the above configuration can easily be applied when manufacturing a joint structure 1 in which the fold-back portion 131 curves along its extension direction (arrow Y direction). In the example illustrated in FIG. 11, the fold-back portion 131 is formed with plural notches 132 at intervals along the edge of the first sheet member 11 and the edge of the second sheet member 12. Alternatively, the fold-back portion 131 may be formed with a single notch 132.

Note that in FIG. 11, the plural joining parts 15 are formed at intervals along the edge of the first sheet member 11 and the edge of the second sheet member 12. However, the joint structure 1 may employ a joining part 15 that is formed continuously using seam welding or the like. In cases in which the joining part 15 is formed continuously in this manner, by providing the notches 132 to the fold-back portion 131, the continuous joining part 15 may join the first sheet member 11, the second sheet member 12, and the third sheet member 13 together without joining the fold-back portion 131 to the first sheet member 11 at the positions of the notches 132, while joining the fold-back portion 131, the first sheet member 11, the second sheet member 12, and the third sheet member 13 together at positions where the notches 132 are absent. Alternatively, the joining part 15 may be formed in a zigzag shape so as to manufacture a joint structure 1 that also includes the joining part 15 that do not join the fold-back portion 131 and the first sheet member 11 together, without the use of the notches 132.

Figure 12:
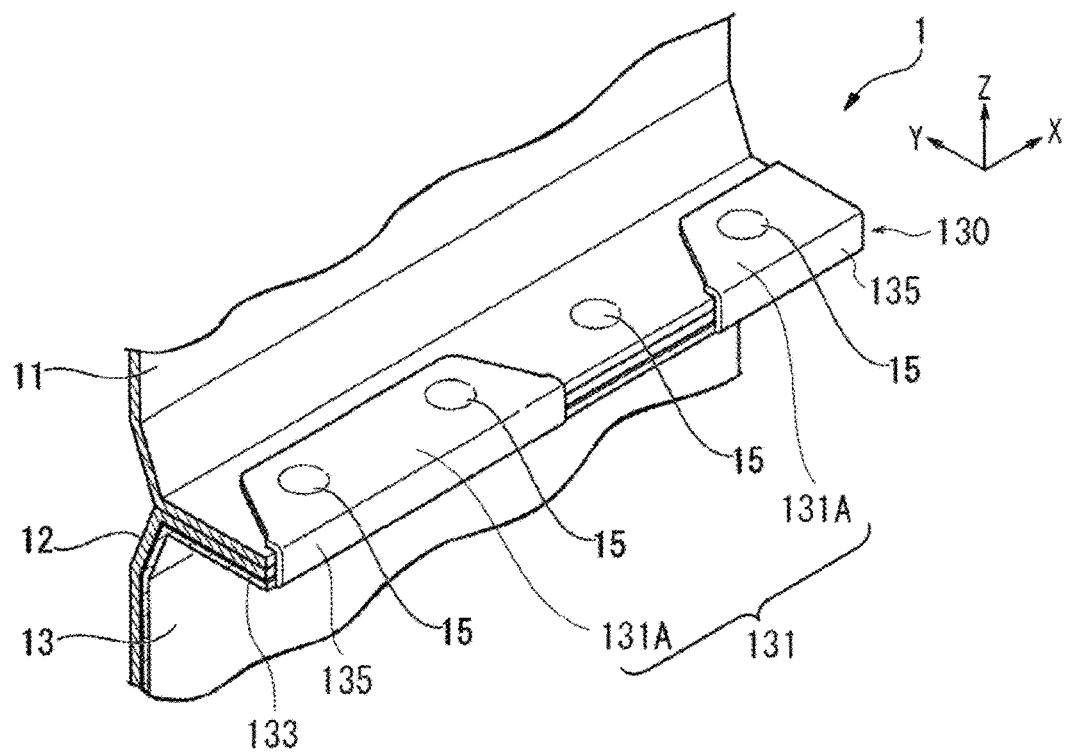
FIG. 12 is a perspective view illustrating a joint structure in which parts of an edge of a first sheet member and an edge of a second sheet member are positioned between plural fold-back tabs.

As described above, there is no need for the edge of the first sheet member 11 and the edge of the second sheet member 12 of the joint structure 1 to overlap the fold-back portion 131 along the entire arrow X direction length of the fold-back portion 131 as viewed along the arrow Z direction. For example, as illustrated in FIG. 12, the fold-back portion 131 may include plural fold-back tabs 131A formed at intervals along the edge of the first sheet member 11 and the edge of the second sheet member 12.

Namely, parts of the edge of the first sheet member 11 and the edge of the second sheet member 12 may be positioned between the plural fold-back tabs 131A such that these parts of the edge of the first sheet member 11 and the edge of the second sheet member 12 are exposed between the plural fold-back tabs 131A.

This enables the quantity of the third sheet member 13 used to be reduced at locations where it is not necessary to increase the strength of the joint structure 1 with respect to bending deformation, enabling a reduction in the weight of the joint structure 1 to be achieved. Moreover, in cases in which the edge of the first sheet member 11 and the edge of the second sheet member 12 curve about their extension direction (arrow Y direction), the structure in FIG. 12 may be employed so as to form the fold-back portion 131 to match this curvature.

As described above, the means used to form the joining parts 15 is not particularly limited. For example, the joining parts 15 may be configured by laser welds. Laser welding enables the joining parts 15 to be formed in a variety of shapes.

Figure 13:
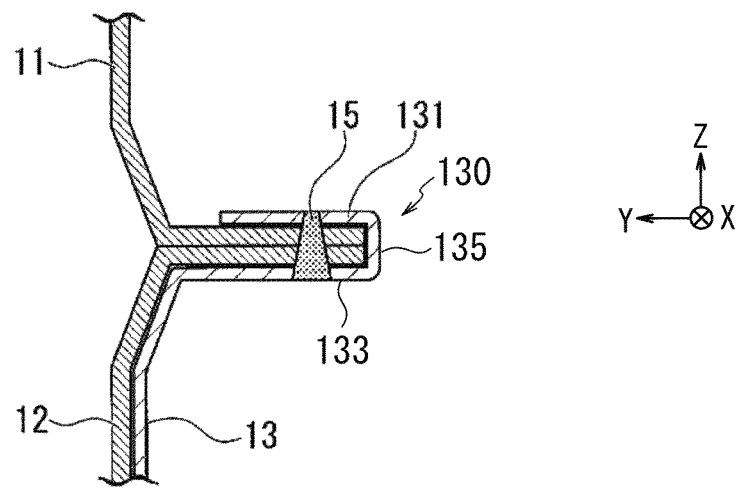
FIG. 13 is a cross-section illustrating a joint structure in which a joining part is configured by a linear laser weld.
Figure 14:
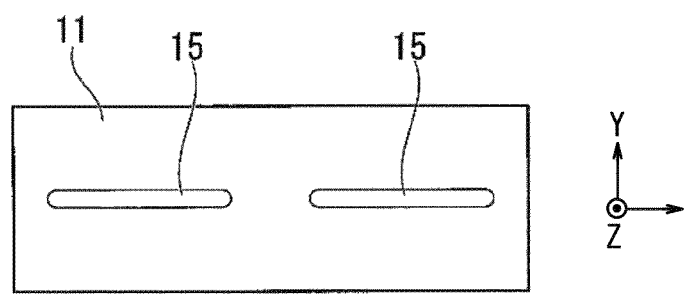
FIG. 14 is a plan view illustrating a joint structure in which joining parts are configured by intermittent linear laser welds.
Figure 15:
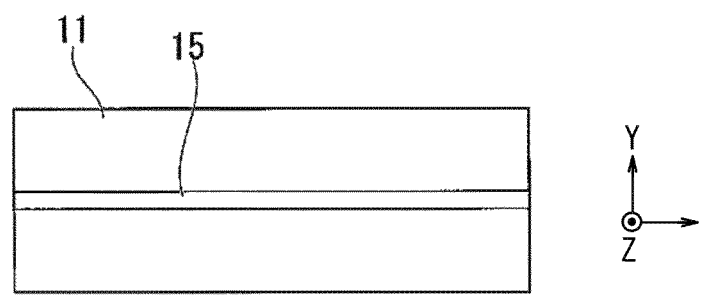
FIG. 15 is a plan view illustrating a joint structure in which a joining part is configured by a continuous linear laser weld.
Figure 16:
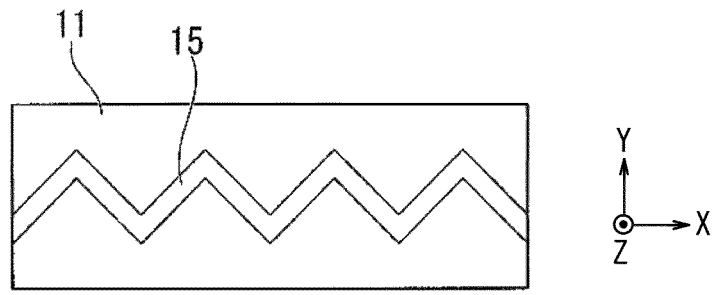
FIG. 16 is a plan view illustrating a joint structure in which a joining part is configured by a zigzagging linear laser weld.

For example, as illustrated in cross-section in FIG. 13 and in plan view in FIG. 14 to FIG. 16, a laser weld serving as a single joining part 15 may be formed in a linear shape.

Figure 17:
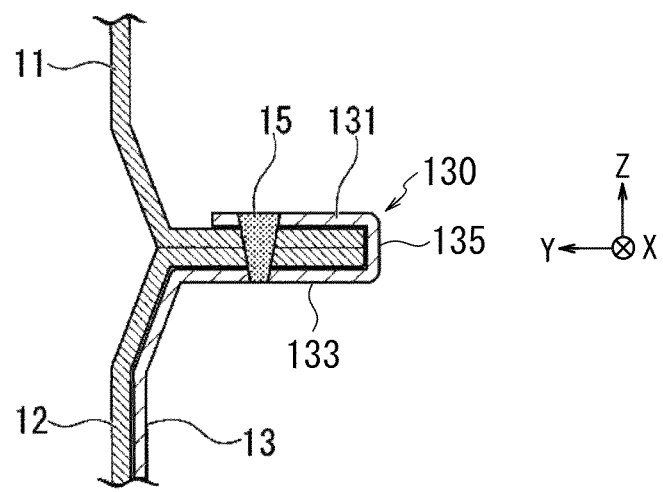
FIG. 17 is a cross-section illustrating a joint structure in which a joining part is configured by a linear laser weld.

The term "linear" is used to encompass, for example, intermittent straight line shapes as illustrated in FIG. 14, a continuous straight line shape as illustrated in FIG. 15, a zigzagging curved line as illustrated in FIG. 16, and wave shapes, but is not limited thereto. As illustrated in FIG. 17, a laser weld serving as a joining part 15 may be formed in a linear shape in plan view at a location at a slight separation from the edge of the first sheet member 11 and the edge of the second sheet member 12, this being a location on the side of the edge of the fold-back portion 131.

Figure 18:
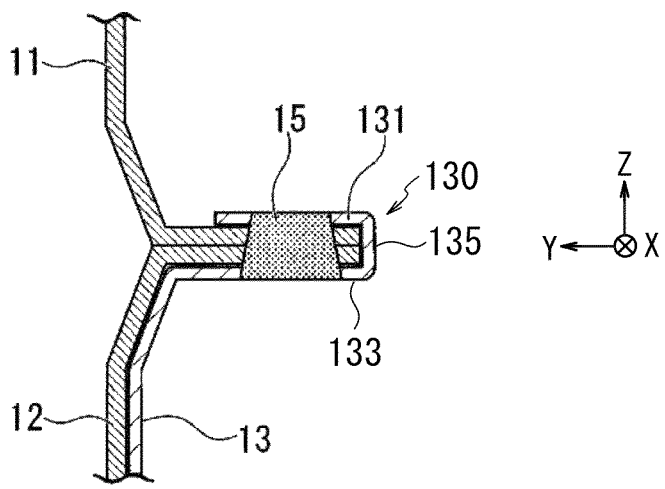
FIG. 18 is a cross-section illustrating a joint structure in which a joining part is configured by a circular shaped laser weld.
Figure 19:
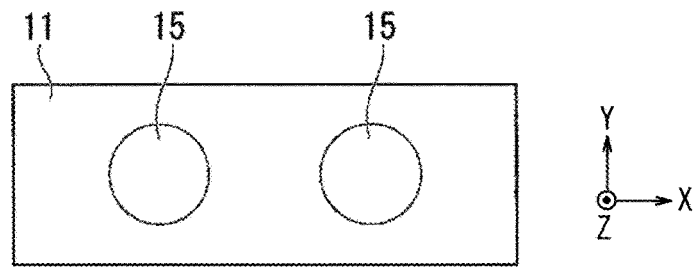
FIG. 19 is a plan view illustrating a joint structure in which joining parts are configured by circular shaped laser welds.
Figure 20:
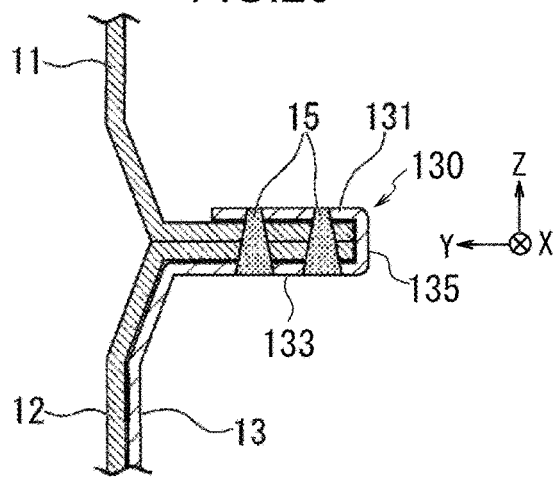
FIG. 20 is a cross-section illustrating a joint structure in which a joining part is configured by a circular circumferential shaped or circular arc shaped laser weld.
Figure 21:
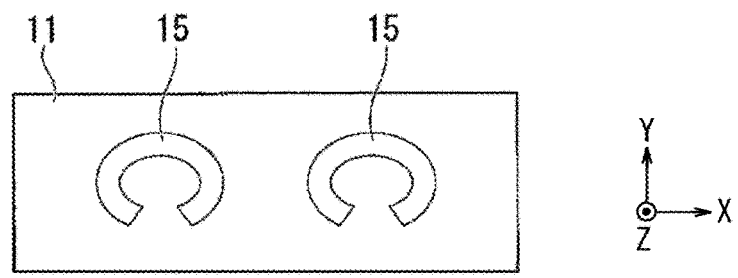
FIG. 21 is a plan view illustrating a joint structure in which joining parts are configured by circular arc shaped laser welds.
Figure 22:
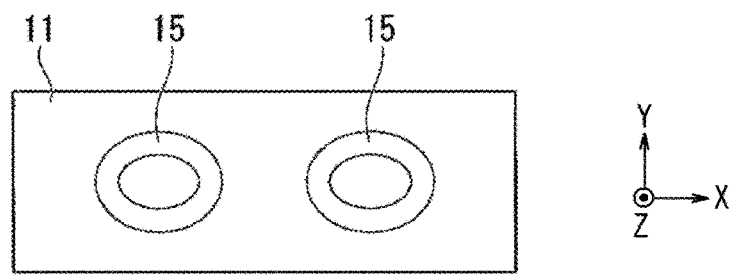
FIG. 22 is a plan view illustrating a joint structure in which joining parts are configured by circular circumferential shaped laser welds.

As illustrated in FIG. 18 and FIG. 19, the joining parts 15 may be configured by circular shaped (disc shaped) laser welds in plan view. As illustrated in FIG. 20 to FIG. 22, a single joining part 15 may be configured by a circular shaped (disc shaped), circular circumferential shaped, or a partial circular circumferential shaped (namely an arc shaped or a C-shaped) laser weld in plan view.

Figure 23:
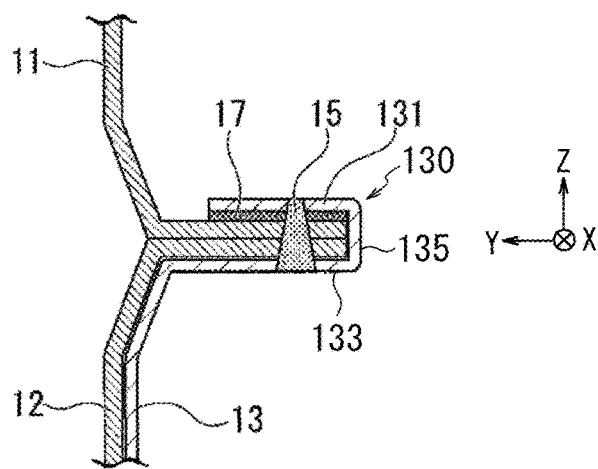
FIG. 23 is a cross-section illustrating joint structure combining a laser weld and an adhesive.

A single joint structure 1 may employ a single shape only, or may employ a combination of two or more such shapes. Moreover, a single joint structure 1 may employ a combination of laser welding and spot welding. However, combining laser welding and adhesive, as illustrated in FIG. 23, risks causing explosive spattering to occur as described previously, and is therefore preferably avoided.

Figure 29:
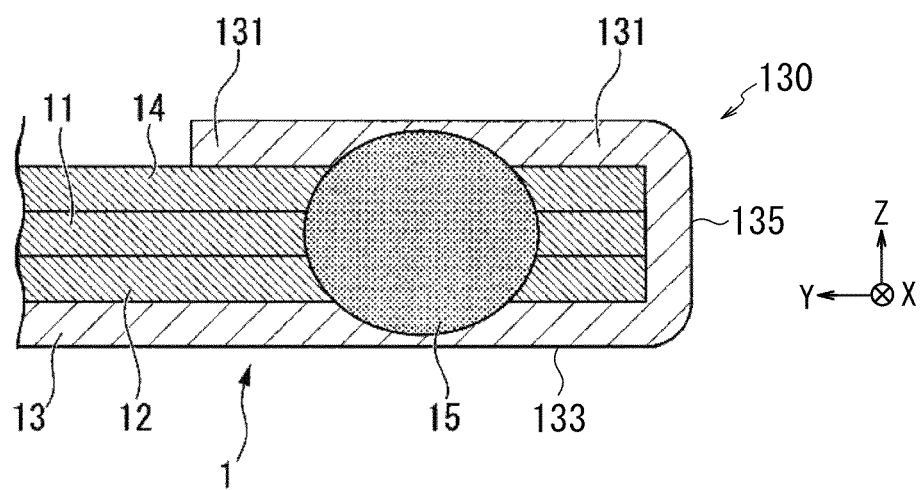
FIG. 29 is a cross-section illustrating a joint structure further including a fourth sheet member.

The number of sheet members configuring the joint structure 1 according to the present exemplary embodiment is not limited to three. For example, as illustrated in FIG. 29, the joint structure 1 may further include a fourth sheet member 14 overlapped with one of the first sheet member 11, the second sheet member 12, or the third sheet member 13 in the arrow Z direction. In the example illustrated in FIG. 29, the fourth sheet member 14 is overlapped on an opposite side from a side of the first sheet member 11 overlapped with the second sheet member 12. Note that the plural joining parts 15 may be formed at locations where the first sheet member 11, the second sheet member 12, the third sheet member 13, and the fourth sheet member 14 overlap, so as to join these members together.

There is nothing to preclude having five or more sheet members. The advantageous effects exhibited by the fold-back portion 131 of the joint structure 1 according to the present exemplary embodiment are unaffected by the number of sheet members.

Figure 26:
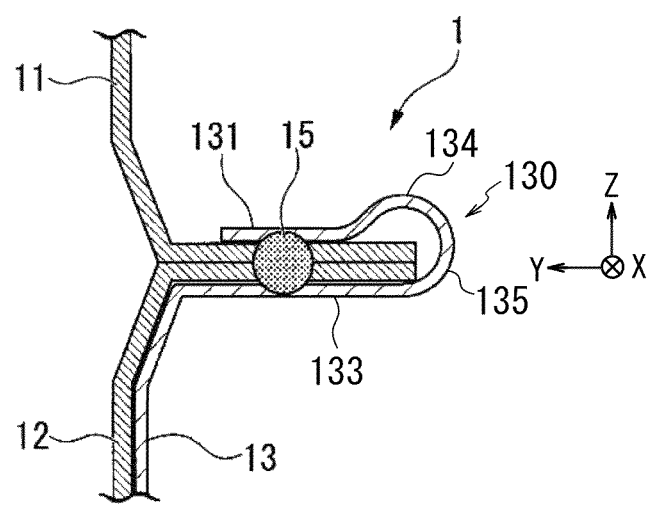
FIG. 26 is a cross-section illustrating a joint structure in which a bent portion of a fold-back portion with a bulge.

As described above, the fold-back portion 131 and the opposing portion 133 of the third sheet member 13 do not need to be overlapped with the first sheet member 11 and the second sheet member 12 such that no gaps are present therebetween. Accordingly, as illustrated in the example of FIG. 26, a bent portion 134 of the fold-back portion 131 may have a bulge in the arrow Z direction.

The bulge of the bent portion 134 in the arrow Z direction causes the bent portion 134 to function as a bead extending along the arrow X direction, thus increasing the rigidity of the fold-back portion 131 and enabling delamination cracking of the joining parts 15 to be even more vigorously prevented.

Moreover, providing the bent portion 134 of the fold-back portion 131 with a bulge enables cracks to be suppressed from occurring at the bent portion 134, even in cases in which the third sheet member 13 is configured by a material having poor local ductile properties, such as an aluminum sheet or high-strength sheet steel.

Although the size of the bulge of the bent portion 134 is not particularly limited, the advantages in terms of increased rigidity are further heightened when the size of the inner part of the bent portion 134 along the arrow Z direction is at least 1.2 times, at least 1.5 times, or at least 2.0 times the combined sheet thickness of the first sheet member 11 and the second sheet member 12.

Moreover, although the shape of the bulge of the bent portion 134 is not particularly limited, the advantages in terms of increased rigidity are further heightened when the bent portion 134 has a substantially circular arc shape as viewed in cross-section along the arrow X direction, since such a shape is capable of suppressing localized concentration of stress.

The bulge of the bent portion 134 may for example be manufactured by employing press hemming to apply the bent portion 134 with a large curvature during preliminary bending, followed by a main bending process that leaves the bent portion 134 intact.

As illustrated in FIG. 27A to FIG. 28C, the joint structure 1 may further include an additional joining part 16. The additional joining part 16 illustrated in FIG. 27A and FIG. 27B, this being a cross-section sectioned along XXVIIB-XXVIIB in FIG. 27A, joins the opposing portion 133, the second sheet member 12, and the fold-back portion 131 together, but does not join the first sheet member 11 and the second sheet member 12 together. As illustrated in FIG. 27C, this being a cross-section sectioned along XXVIIC-XXVIIC in FIG. 27A, the joint structure 1 may include both the standard joining parts 15 and the additional joining part 16.

Figure 28B:
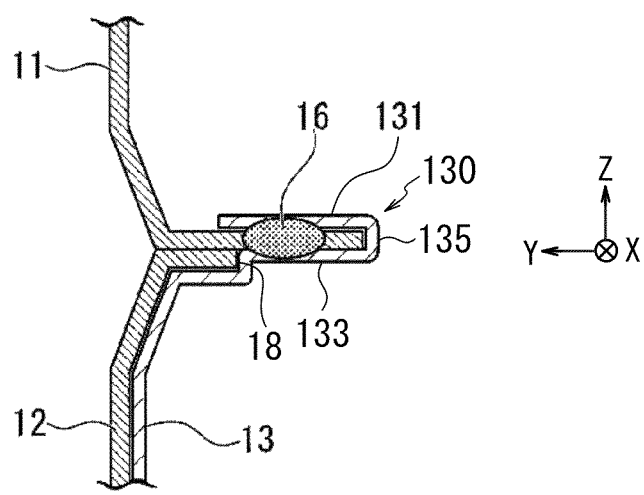
FIG. 28B is a cross-section of the joint structure illustrated in FIG. 28A as sectioned along XXVIIIB-XXVIIIB.
Figure 28C:
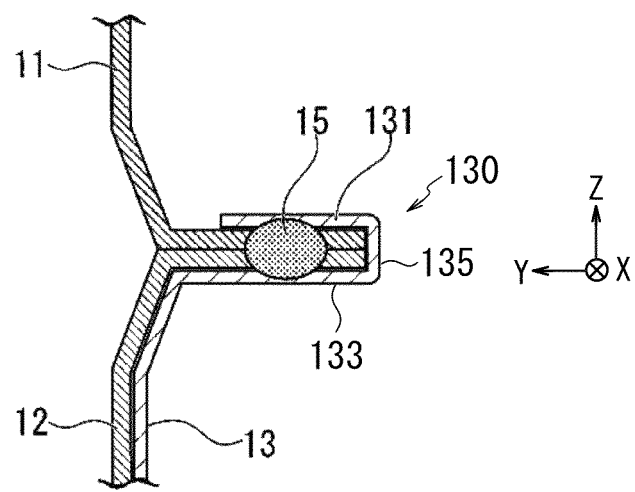
FIG. 28C is a cross-section of the joint structure illustrated in FIG. 28A as sectioned along XXVIIIC-XXVIIIC.

The additional joining part 16 illustrated in FIG. 28A and FIG. 28B, this being a cross-section sectioned along XXVIIIB-XXVIIIB in FIG. 28A, joins the opposing portion 133, the first sheet member 11, and the fold-back portion 131 together, but does not join the first sheet member 11 and the second sheet member 12 together. As illustrated in FIG. 28C, this being a cross-section sectioned along XXVIIIC-XXVIIIC in FIG. 28A, the joint structure 1 may include both the standard joining parts 15 and the additional joining part 16. Whichever of the first sheet member 11 or the second sheet member 12 is not joined by the additional joining part 16 may include a notch 18 at the position of the additional joining part 16.

Although the additional joining part 16 does not function to join the first sheet member 11 and the second sheet member 12 together, the additional joining part 16 does join the opposing portion 133 and the fold-back portion 131 to the first sheet member 11 or the second sheet member 12. The additional joining part 16 is provided to stabilize the joining part strength between the fold-back portion 131 and the opposing portion 133. The notch 18 provided to the first sheet member 11 or the second sheet member 12 configures a non-joining part location between the first sheet member 11 and the second sheet member 12, and is thus a location where an opening is liable to occur.

Note that joining not only the fold-back portion 131 but also the opposing portion 133 and the second sheet member 12 or the first sheet member 11 using the additional joining part 16 enables openings to be even more vigorously prevented from occurring at a non-joining part location during bending deformation. Moreover, when the joint structure 1 includes the notch 18, the amount of first sheet member 11 or second sheet member 12 used is reduced by an amount commensurate with the notch 18, thereby enabling a reduction in the weight and material costs of the joint structure 1 to be achieved.

The joint structure 1 according to the present exemplary embodiment is not particularly limited in purpose. Although for ease of explanation, FIG. 2 illustrates an example of a member with a box-shaped cross-section in order to explain the technical concept of the joint structure 1 according to the present exemplary embodiment, the joint structure 1 is capable of obtaining an excellent advantageous effect of improving joining part strength when applied to members with other profiles.

One example of preferable application of the joint structure 1 according to the present exemplary embodiment is to an automotive component including the joint structure 1. Examples of such automotive components include an automotive pillar, a side sill, a bumper, a front side member, and a roof rail. The automotive pillar or roof rail may include two high-strength steel sheets configuring a first structural member and a second structural member used to secure automotive strength, and an outer panel disposed at the outer side of the first structural member and the second structural member.

Note that the high-strength sheet steel employed for the first structural member and the second structural member may correspond to the first sheet member 11 and the second sheet member 12 of the joint structure 1 according to the present exemplary embodiment, and the outer panel may correspond to the third sheet member 13.

Figure 30A:
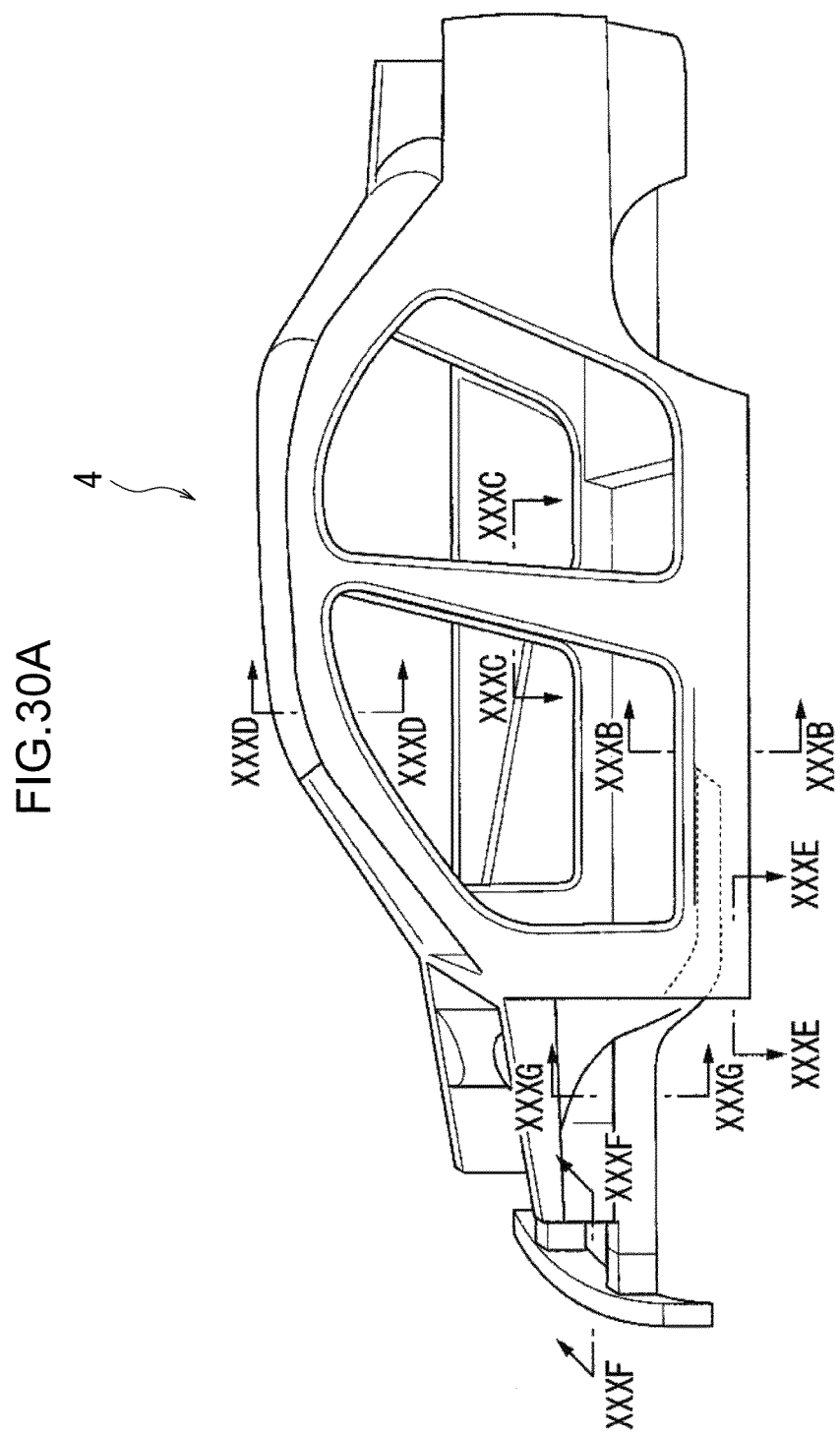
FIG. 30A is a perspective view illustrating a vehicle body including plural automotive components.
Figure 30B:
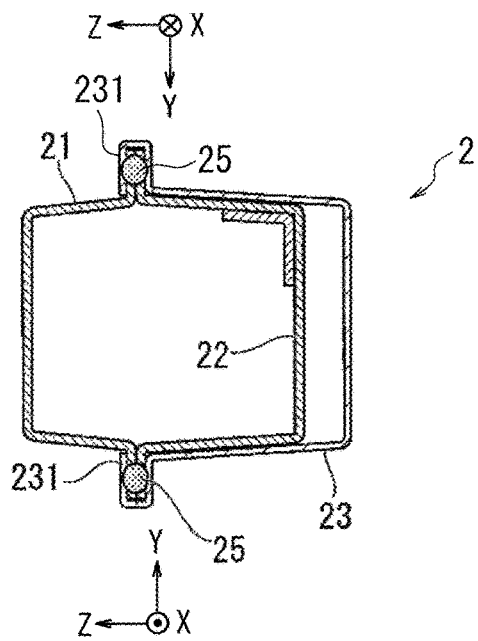
FIG. 30B is a cross-section of an automotive component illustrated in FIG. 30A as sectioned along XXXB-XXXB.
Figure 30C:
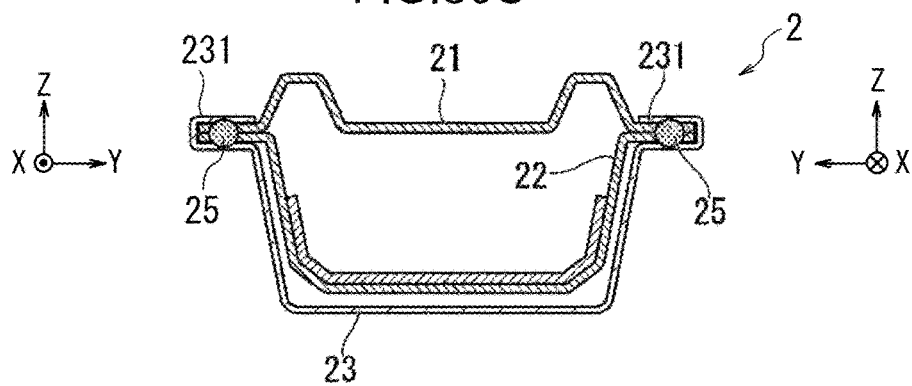
FIG. 30C is a cross-section of an automotive component illustrated in FIG. 30A as sectioned along XXXC-XXXC.
Figure 30D:
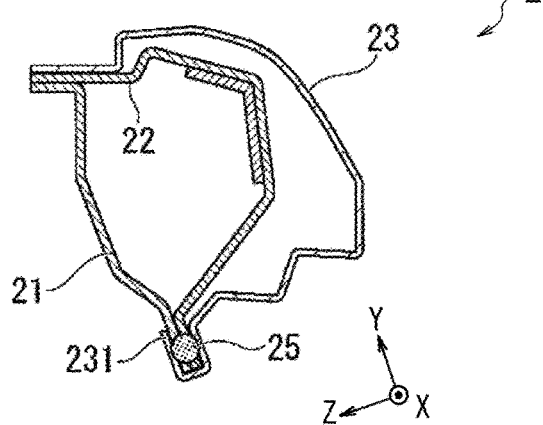
FIG. 30D is a cross-section of an automotive component illustrated in FIG. 30A as sectioned along XXXD-XXXD.

Namely, automotive components 2 such as those illustrated in FIG. 30B to FIG. 30G may be applied at various locations of a vehicle body 4, illustrated in FIG. 30A. These automotive components 2 include a first structural member 21, a second structural member 22, an outer panel 23, and plural joining parts 25. The first structural member 21, the second structural member 22, the outer panel 23, and the plural joining parts 25 correspond to the first sheet member 11, the second sheet member 12, the third sheet member 13, and the plural joining parts 15 of the joint structure 1 described above.

The second structural member 22 is overlapped with the first structural member 21 in a sheet thickness direction of the second structural member 22. The outer panel 23 is overlapped on an opposite side of the second structural member 22 from a side overlapped with the first structural member 21 in the sheet thickness direction of the second structural member 22. The arrow X direction, the arrow Y direction, and the arrow Z direction are mutually orthogonal to one another. The arrow Z direction corresponds to the sheet thickness direction of the second structural member 22.

The plural joining parts 25 are formed at locations where the first structural member 21, the second structural member 22, and the outer panel 23 overlap, so as to join the first structural member 21, the second structural member 22, and the outer panel 23 together. The plural joining parts 25 are formed at intervals along the edge of the first structural member 21 and the edge of the second structural member 22. The arrow X direction corresponds to a direction along the edge of the first structural member 21 and the edge of the second structural member 22, namely corresponds to a direction in which the plural joining parts 25 are arrayed at intervals.

The outer panel 23 includes a fold-back portion 231. The fold-back portion 231 is folded back around the edge of the first structural member 21 and the edge of the second structural member 22 at least between the plural joining parts 25, so as to be disposed on an opposite side of the first structural member 21 from a side overlapped with the second structural member 22.

Figure 30E:
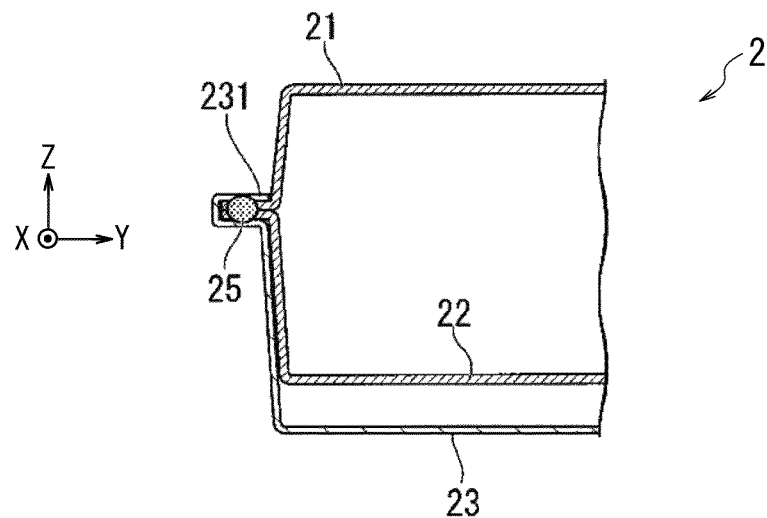
FIG. 30E is a cross-section of an automotive component illustrated in FIG. 30A as sectioned along XXXE-XXXE.
Figure 30F:
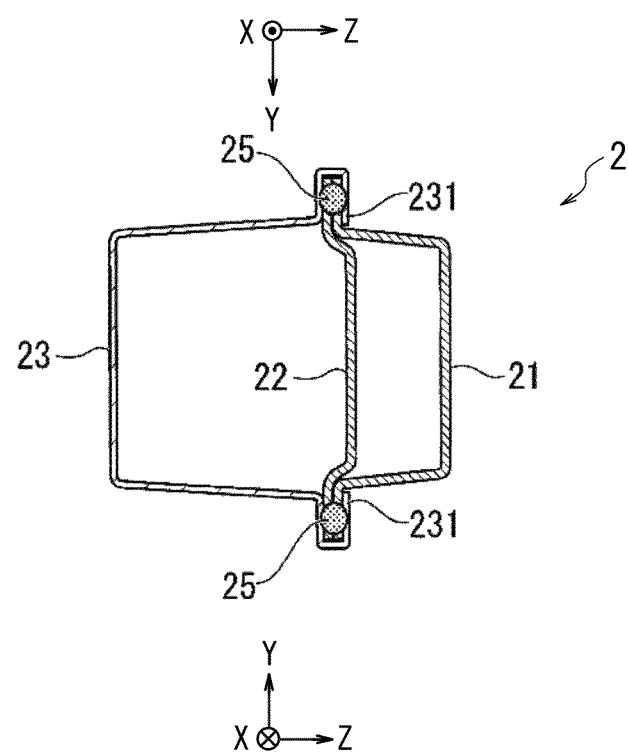
FIG. 30F is a cross-section of an automotive component illustrated in FIG. 30A as sectioned along XXXF-XXXF.

This configuration enables the bending strength of the automotive component 2 such as a pillar or roof rail to be improved, thereby improving automotive collision safety, without increasing the number of vehicle components. Specifically, the automotive component 2 according to the present exemplary embodiment is capable of reducing fracturing of the joining parts 25 in a side-on collision when applied to a B-pillar (FIG. 30C), is capable of reducing fracturing of the joining parts 25 in a side-on pole collision when applied to a roof rail (FIG. 30D), and is capable of reducing fracturing of the joining parts 25 in small overlap collision testing when applied to a side sill (FIG. 30B) or to a lower portion of an A-pillar (FIG. 30E).

Figure 30G:
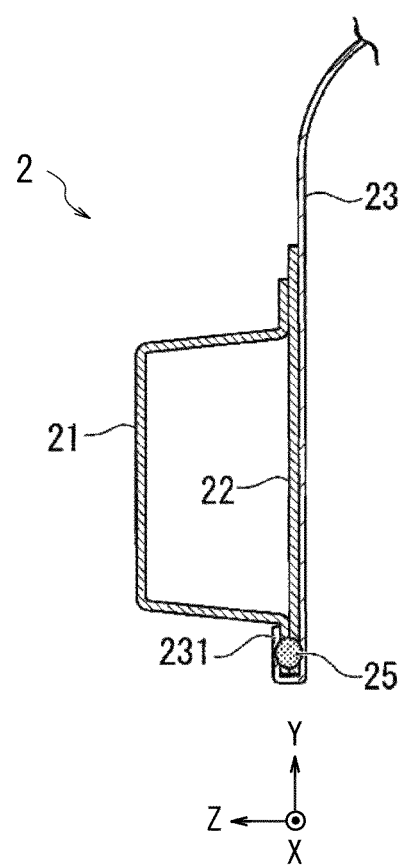
FIG. 30G is a cross-section of an automotive component illustrated in FIG. 30A as sectioned along XXXG-XXXG.

Moreover, the automotive component 2 according to the present exemplary embodiment is capable of reducing fracturing of the joining parts 25 in a front-on collision or a rear-on collision when applied to a bumper (FIG. 30F) or to a front side member (FIG. 30G).

Note that applying the joint structure 1 according to the present exemplary embodiment to an automotive component has a secondary effect of raising the rigidity of the relevant members, and thus also contributes to vehicle body rigidity and noise, vibration, and harshness (NVH) improvements. The automotive component 2 may obviously also incorporate the various characteristics of the joint structure 1 described above.

For example, the joining parts 25 may be configured by welds (spot welds, seam welds, laser welds, or the like), or may employ a joining means that does not require melting, such as the various mechanical joining means, the friction stir spot welding means, or the like, described above with respect to the joining parts 15. The positions of the joining parts 25, the members joined together by the joining parts 25, the presence or absence and positions of notches, the presence or absence of adhesive, the presence or absence of a bulge at a bent portion, the presence or absence of additional joining part joining parts, and so on may also be modified as appropriate as in the case of the joint structure 1 described above.

The outer panel 23 of the automotive component 2 including the joint structure 1 may be a cosmetic outer panel (outer surface panel) configuring the cosmetic exterior of an automobile.

EXAMPLES

First Example

In a first example, in order to confirm the advantageous effects of the present invention, a FEM simulation was employed to analyze resistance to bending deformation in a joint structure of examples corresponding to the present invention and a joint structure of conventional technology.

Figure 31:
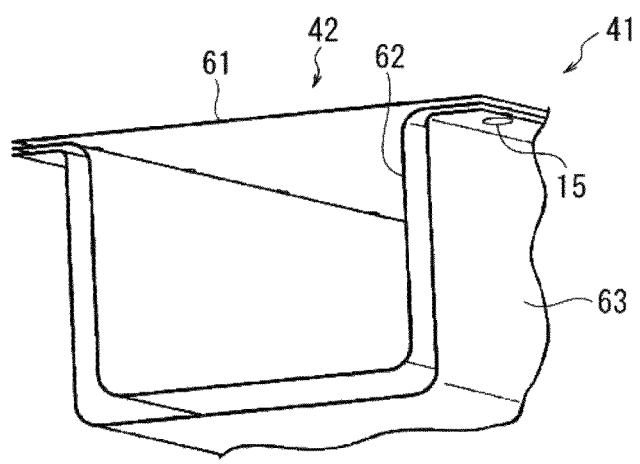
FIG. 31 is a diagram illustrating an analysis model for a box-shaped structural member of conventional technology.
Figure 32:
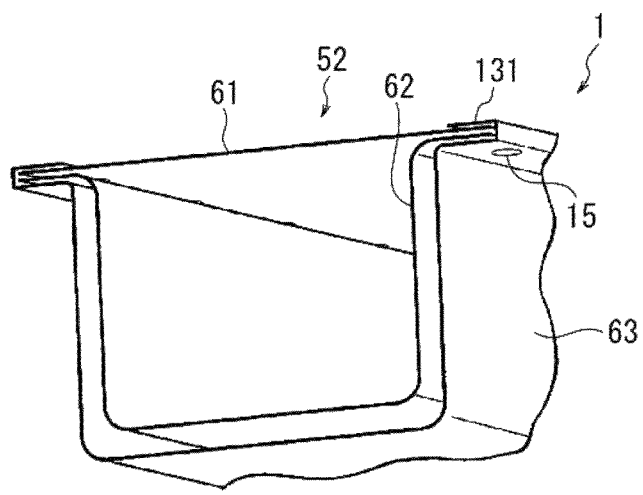
FIG. 32 is a diagram illustrating an analysis model for a box-shaped structural member of a present invention example.

In a first example, analysis models were created for a box-shaped structural member 42 including a joint structure 41 according to conventional technology, illustrated in FIG. 31, and a box-shaped structural member 52 including the joint structure 1 according to a present invention example (present exemplary embodiment), illustrated in FIG. 32.

The box-shaped structural members 42, 52 were configured by intermittently joining a flat plate 61, a first hat-shaped cross-section member 62, and a second hat-shaped cross-section member 63 together at edges thereof using plural joining parts 15 configured by spot welds. The flat plate 61 corresponds to a first sheet member, the first hat-shaped cross-section member 62 corresponds to a second sheet member, and the second hat-shaped cross-section member 63 corresponds to a third sheet member.

The tensile strength of the first hat-shaped cross-section member 62 was set to 270 MPa (with a sheet thickness of 0.75 mm), and the tensile strength of both the second hat-shaped cross-section member 63 and the flat plate 61 was set to 1800 MPa (with a sheet thickness of 1.6 mm). The plural joining parts 15 were formed at a pitch of 50 mm. The nugget diameter of the joining parts 15 configured by spot welds was set to 4.3 mm between the first hat-shaped cross-section member 62 and the flat plate 61 and between the first hat-shaped cross-section member 62 and the second hat-shaped cross-section member 63, and to 6.3 mm between the first hat-shaped cross-section member 62 and the second hat-shaped cross-section member 63.

In the box-shaped structural member 52 of the present invention example illustrated in FIG. 32, the edge of the second hat-shaped cross-section member 63 was provided with the fold-back portion 131 (width set to 15 mm), whereas in the box-shaped structural member 42 of conventional technology illustrated in FIG. 31, the edge of the second hat-shaped cross-section member 63 was not provided with the fold-back portion 131.

Note that the FEM simulations corresponding to FIG. 32 envisaged both an analysis model in which the fold-back portion 131 was joined to the flat plate 61 by the joining parts 15 and an analysis model in which the fold-back portion 131 was not joined to the flat plate 61 by the joining parts 15.

A Present Invention Example 1 corresponds to an analysis model in which the fold-back portion 131 overlaps the joining parts 15 but the fold-back portion 131 is not joined to the flat plate 61 by the joining parts 15, namely an analysis model in which the flat plate 61, the first hat-shaped cross-section member 62, and the second hat-shaped cross-section member 63 are joined together by the joining parts 15 (three-layer lap welding).

A Present Invention Example 2 corresponds to an analysis model in which the fold-back portion 131 overlaps the joining parts 15, and the fold-back portion 131 is joined to the flat plate 61 by the joining parts 15, namely an analysis model in which the fold-back portion 131, the flat plate 61, the first hat-shaped cross-section member 62, and the second hat-shaped cross-section member 63 are joined together by the joining parts 15 (four-layer lap welding).

A Present Invention Example 3 corresponds to an analysis model in which the fold-back portion 131, the flat plate 61, the first hat-shaped cross-section member 62, and the second hat-shaped cross-section member 63 are joined together by the joining parts 15 (four-layer lap welding), and in which the fold-back portion 131 is provided with notches 132 (see FIG. 9) positioned between the plural joining parts 15.

Figure 33:
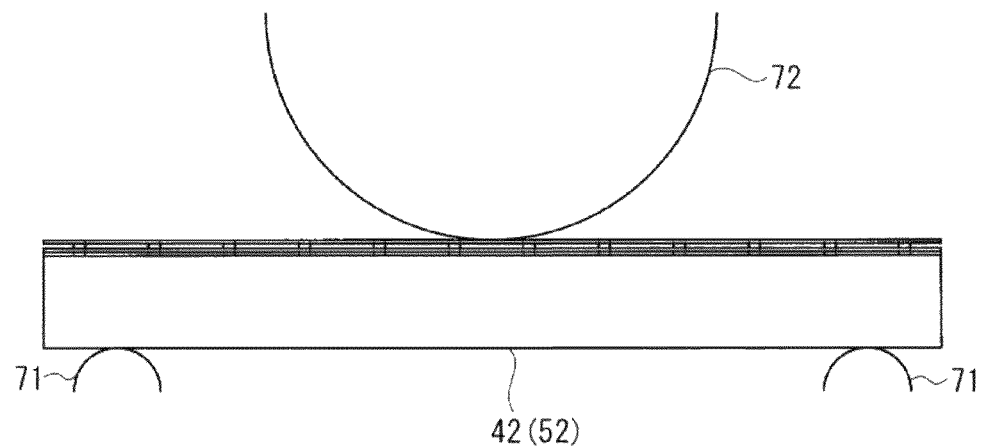
FIG. 33 is a diagram to explain a three-point bending method applied to a box-shaped structural member.
Figure 34:
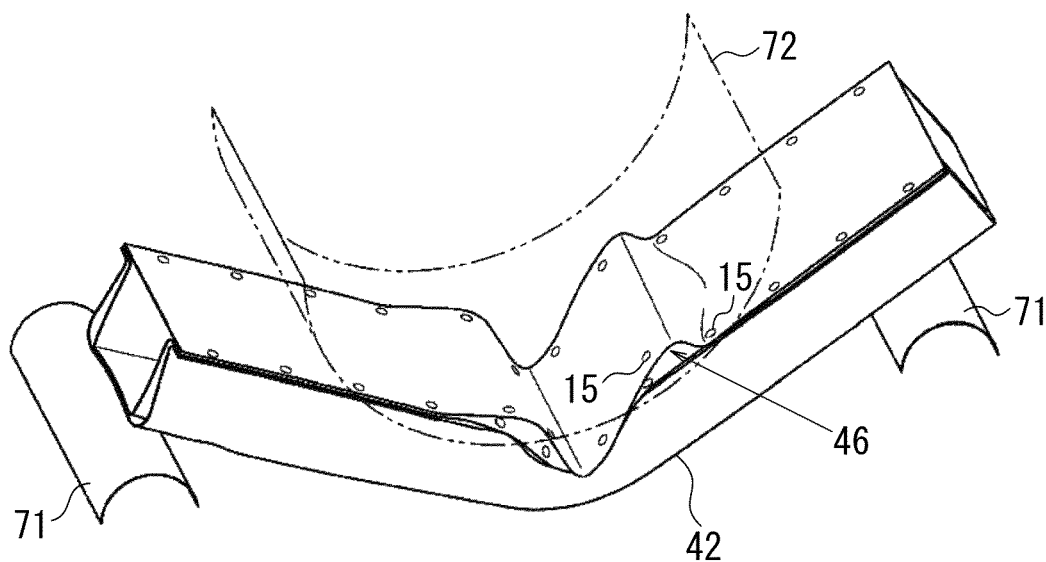
FIG. 34 is a diagram illustrating analysis results of FEM simulation of a state of a box-shaped structural member of a comparative example (conventional technology) following three-point bending.

Next, the way in which these box-shaped structural members 42, 52 deform was simulated for a case in which three-point bending was applied using a pair of supports 71 and an impactor 72, as illustrated in FIG. 33. The strengths of the sheet steel were the same as described above. FIG. 34 to FIG. 37 are diagrams illustrating the calculated appearance of the box-shaped structural members 52 of the present invention examples and the box-shaped structural member 42 of a comparative example (conventional technology) following application of three-point bending to a displacement amount of 100 mm of the same impactor 72. FIG. 34 illustrates the comparative example (conventional technology), and FIG. 35 to FIG. 37 respectively illustrate the Present Invention Examples 1 to 3.

Figure 38:
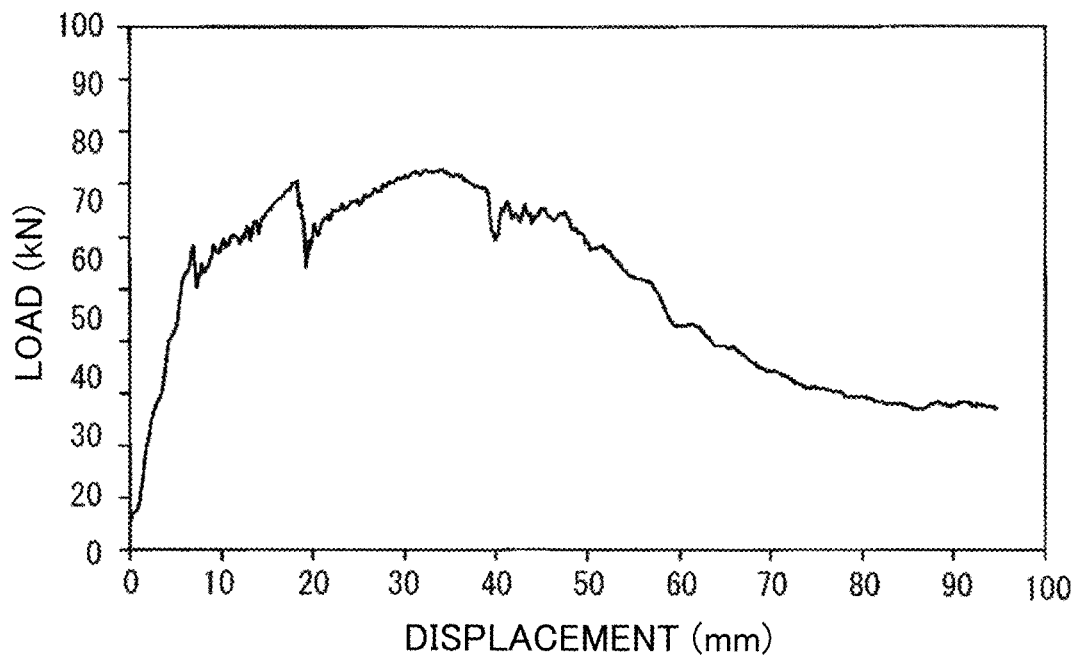
FIG. 38 is a graph (load-displacement graph) illustrating analysis results of FEM simulation to illustrate a relationship between load induced by an impactor and impactor displacement amount for the comparative example (conventional technology).

FIG. 38 to FIG. 41 are graphs illustrating calculated relationships between load induced by an impactor and impactor displacement (load-displacement graphs). FIG. 38 illustrates the comparative example (conventional technology), and FIG. 39 to FIG. 41 respectively illustrate the Present Invention Examples 1 to 3.

Note that the configurations and calculated results for the Present Invention Examples 1 to 3 and the comparative example (conventional technology) are as set out in Table 1 below.

Figure 39:
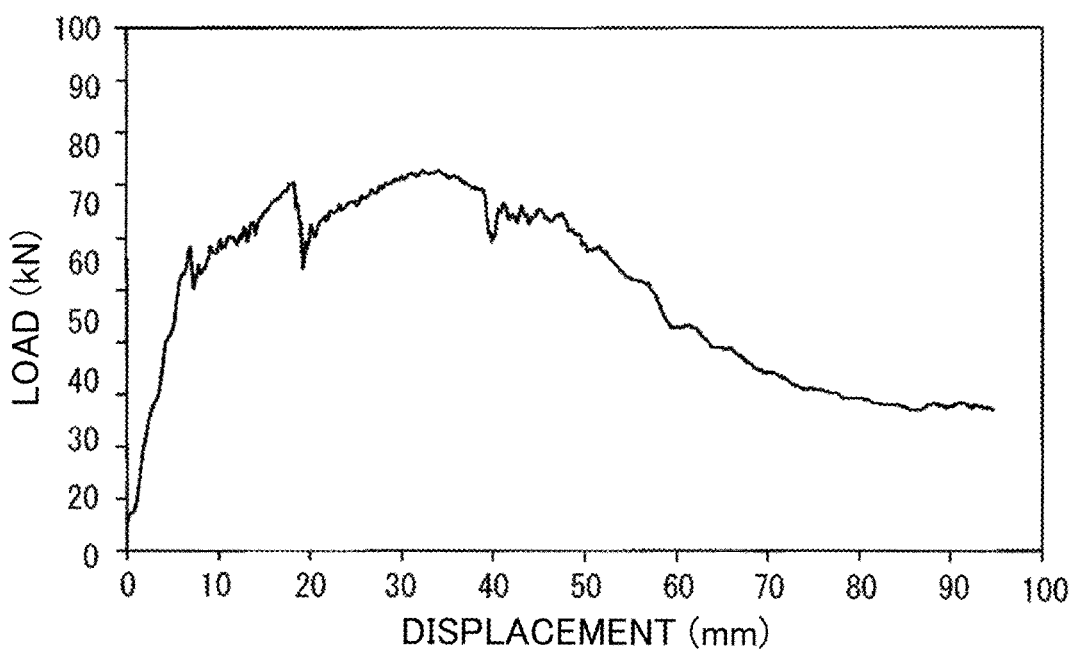
FIG. 39 is a load-displacement graph for the Present Invention Example 1.

On the other hand, as illustrated in FIG. 39, although fracturing of the joining parts in the Present Invention Example 1 did occur at an impactor displacement of around 9 mm, there was a reduction in subsequent fracturing of the joining parts. As a result the maximum load on the box-shaped structural member was calculated to be improved to around 78 kN.

Figure 40:
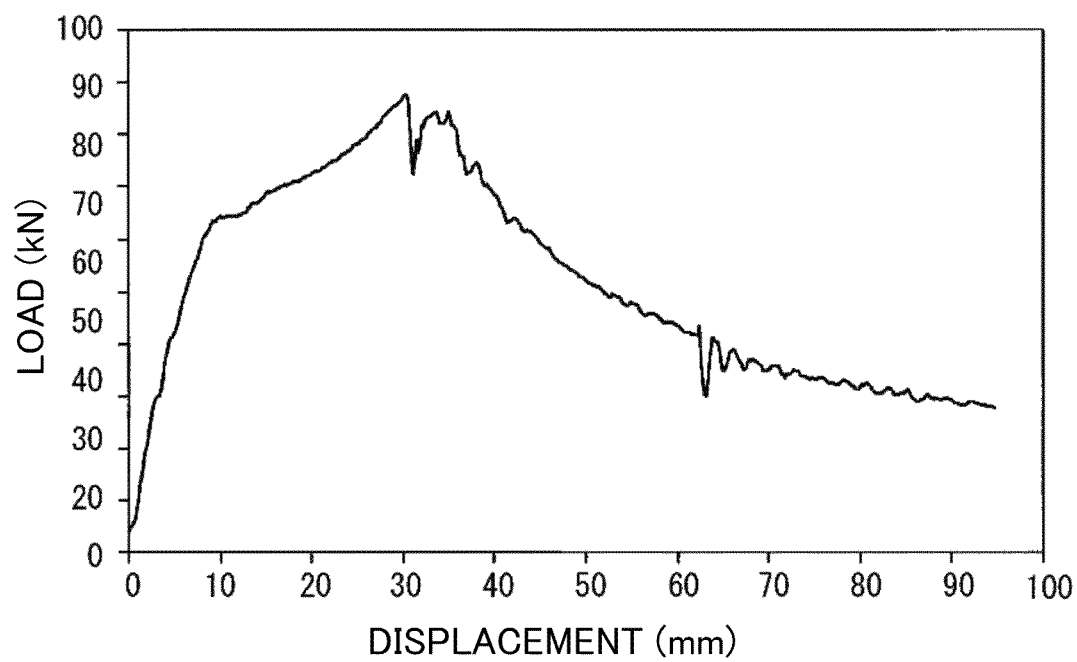
FIG. 40 is a load-displacement graph for the Present Invention Example 2.

As illustrated in FIG. 40, fracturing of the joining parts in the Present Invention Example 2, was not calculated to occur until the impactor displacement reached 30 mm. The maximum load on the box-shaped structural member was expected to be around 88 kN.

Figure 41:
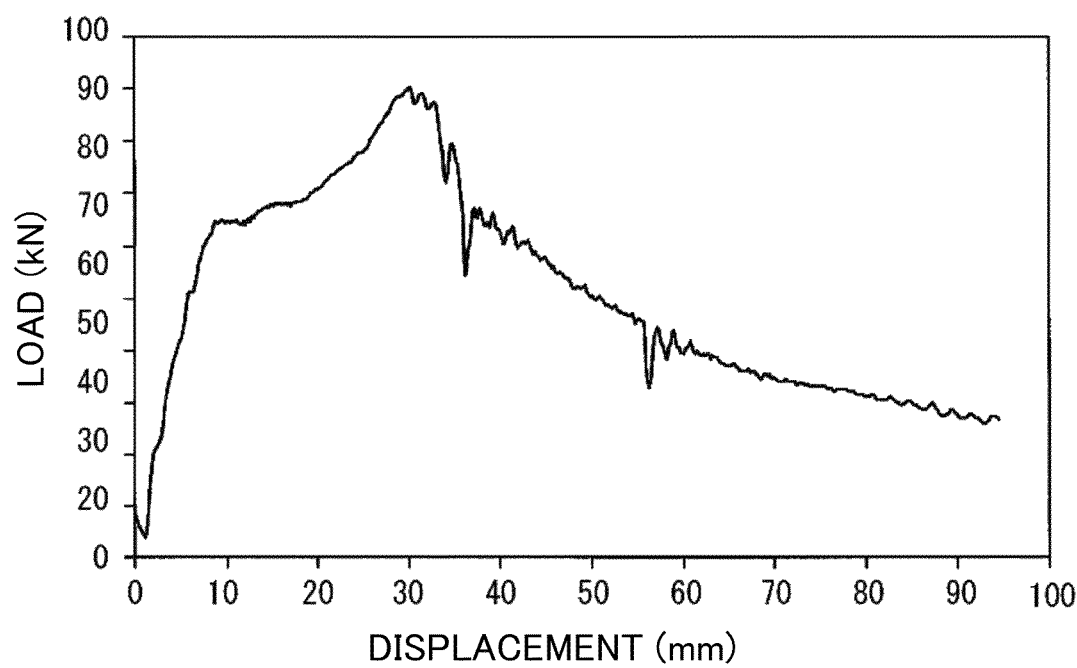
FIG. 41 is a load-displacement graph for the Present Invention Example 3.

As illustrated in FIG. 41, fracturing of the joining parts in the Present Invention Example 3 was not expected to occur until the impactor displacement reached 35 mm. The maximum load on the box-shaped structural member was calculated to be around 90 kN.

TABLE 1

Figure 35:
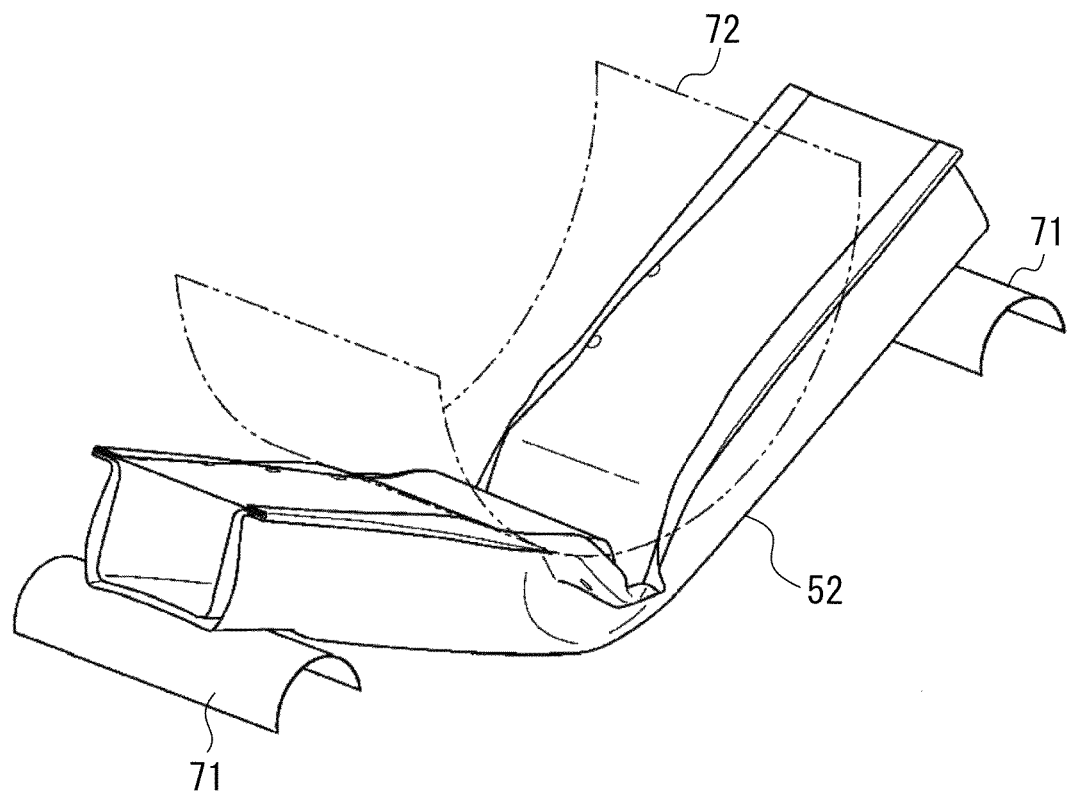
FIG. 35 is a diagram illustrating analysis results of FEM simulation of a state of a box-shaped structural member of a Present Invention Example 1 following three-point bending.
Figure 36:
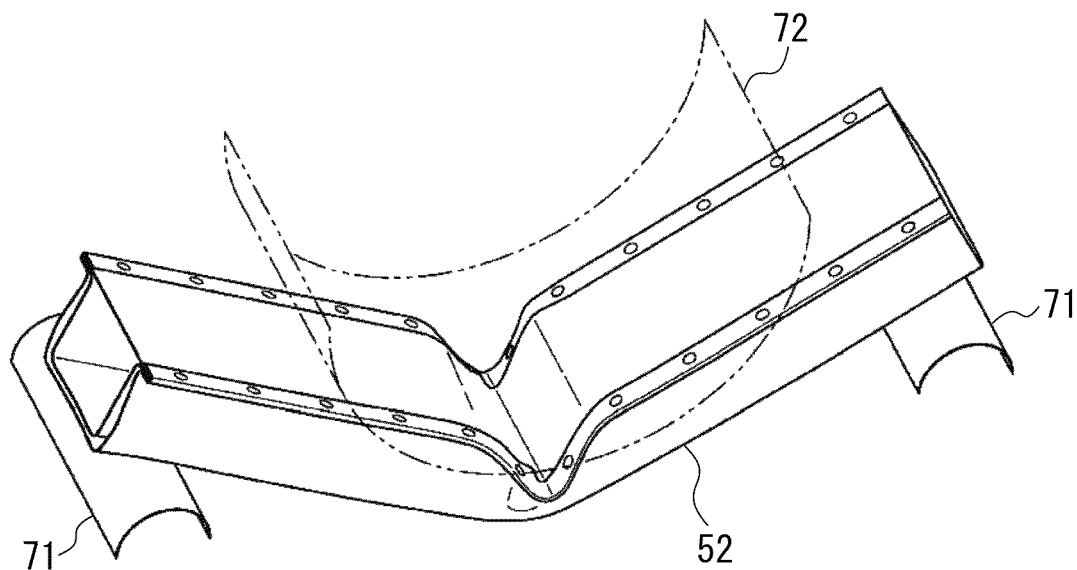
FIG. 36 is a diagram illustrating analysis results of FEM simulation of a state of a box-shaped structural member of a Present Invention Example 2 following three-point bending.
Figure 37:
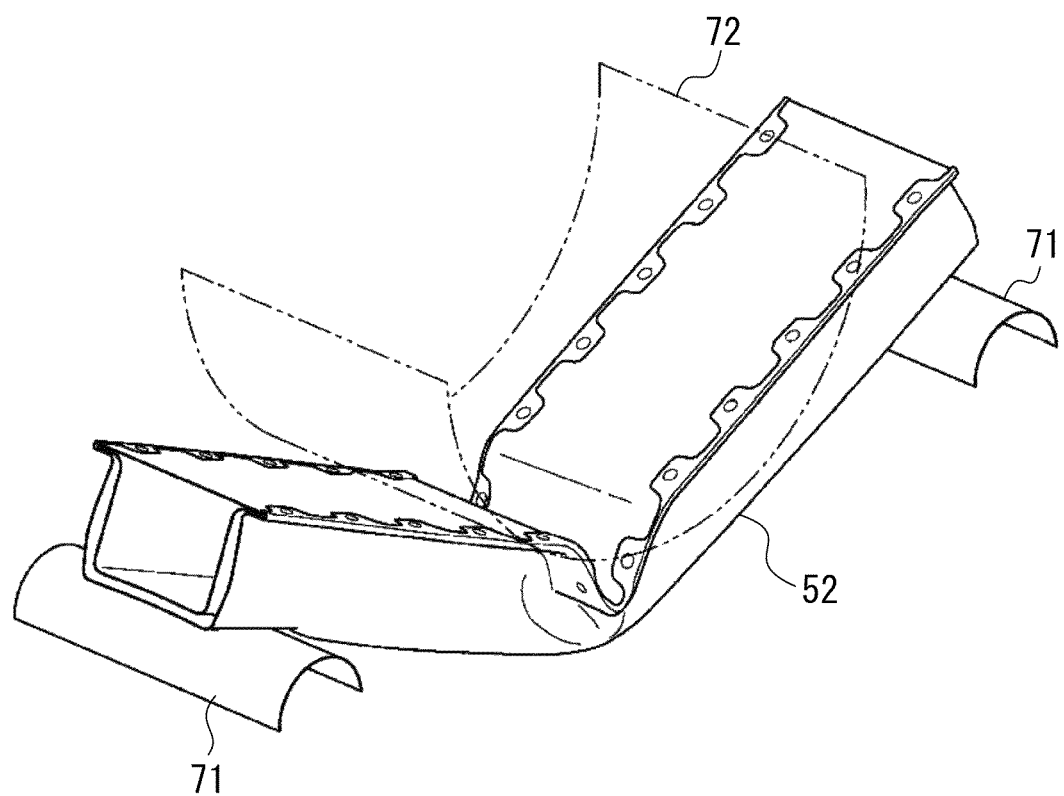
FIG. 37 is a diagram illustrating analysis results of FEM simulation of a state of a box-shaped structural member of a Present Invention Example 3 following three-point bending.

| | FOLD-BACK PORTION | MEMBERS JOINED AT SPOT WELD | CALCULATION RESULT |
|---|---|---|---|
| COMPARATIVE EXAMPLE (CONVENTIONAL TECHNOLOGY) | ABSENT | FIRST HAT-SHAPED CROSS-SECTION MEMBER, SECOND HAT-SHAPED CROSS-SECTION MEMBER, FLAT PLATE | SEE FIG. 34 AND FIG. 38 |
| PRESENT INVENTION EXAMPLE 1 | PRESENT | FIRST HAT-SHAPED CROSS-SECTION MEMBER, SECOND HAT-SHAPED CROSS-SECTION MEMBER, FLAT PLATE | SEE FIG. 35 AND FIG. 39 |
| PRESENT INVENTION EXAMPLE 2 | PRESENT | FIRST HAT-SHAPED CROSS-SECTION MEMBER, SECOND HAT-SHAPED CROSS-SECTION MEMBER, FLAT PLATE, FOLD-BACK PORTION | SEE FIG. 36 AND FIG. 40 |
| PRESENT INVENTION EXAMPLE 3 | PRESENT (WITH NOTCHES) | FIRST HAT-SHAPED CROSS-SECTION MEMBER, SECOND HAT-SHAPED CROSS-SECTION MEMBER, FLAT PLATE, FOLD-BACK PORTION | SEE FIG. 37 AND FIG. 41 |

As illustrated in FIG. 34, for the box-shaped structural member 42 of the comparative example (conventional technology), an opening 46 was calculated as occurring between the joining parts 15 and the joining parts 15 were calculated to fracture in the vicinity of the opening 46. As illustrated in FIG. 35 to FIG. 37, for the box-shaped structural members 52 of the Present Invention Examples 1 to 3, reduced openings between the joining parts 15 and reduced fracturing of the joining parts 15 was calculated to occur.

As illustrated in FIG. 38, in the load-displacement graph for the box-shaped structural member of the comparative example (conventional technology), there were plural locations seen where there was a temporarily decrease in load as the impactor displacement is being increased.

Specifically, such locations can be seen when the impactor displacement is approximately 7 mm, approximately 20 mm, and approximately 40 mm. These locations indicate the occurrence of fracturing of the joining parts configured by spot welds. In the box-shaped structural member of the conventional technology, the first fracturing of the joining parts was calculated to occur when the impactor displacement reached approximately 7 mm. Moreover, the maximum load on the box-shaped structural member of the comparative example (conventional technology) was calculated to be around 72 kN.

Thus, fracturing of the joining parts was calculated to be suppressed in the present invention (Present Invention Examples 1 to 3), and an improvement in the maximum load on the box-shaped structural member was calculated to be achieved.

Note that there was calculated to be no significant difference between the load-displacement graphs of the comparative example (conventional technology) and the present invention examples until the occurrence of initial spot weld fracturing of the box-shaped structural member of the comparative example (conventional technology).

Second Example

Figure 42:
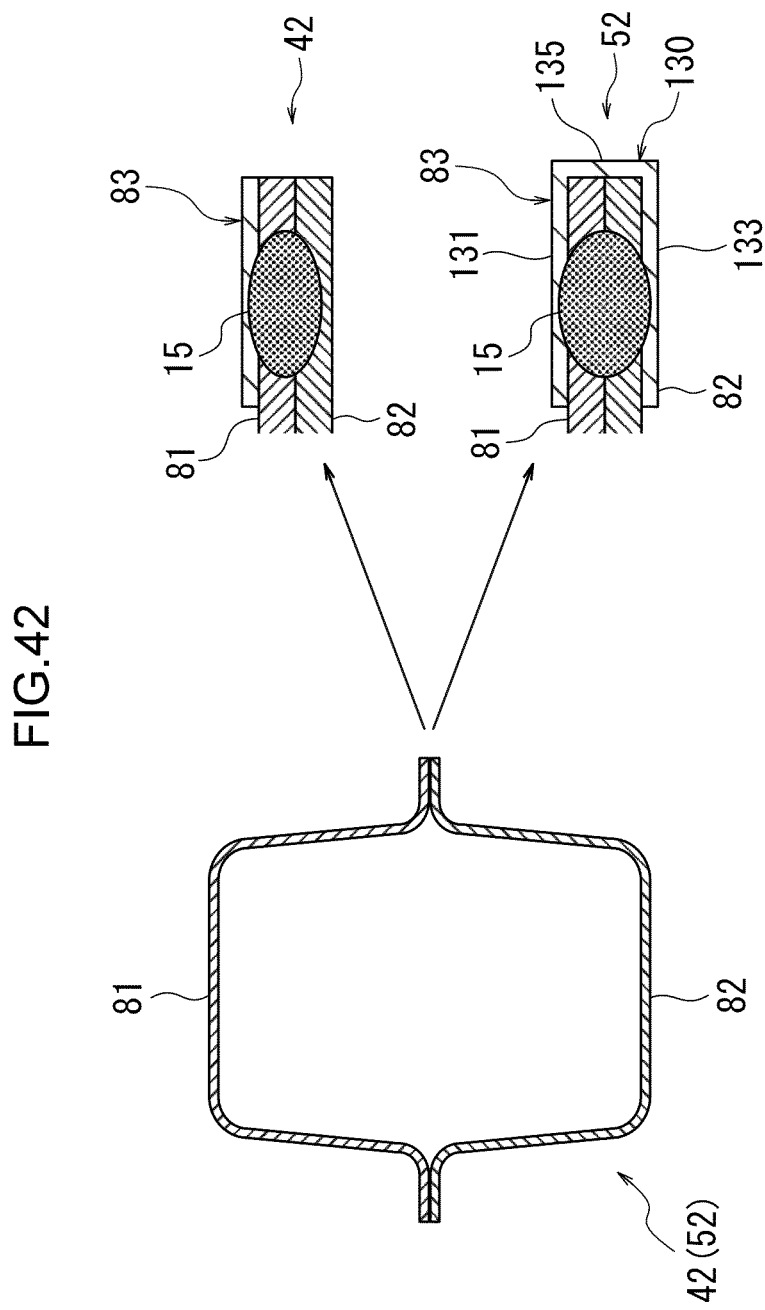
FIG. 42 is a diagram illustrating a comparison between box-shaped structural member structures of conventional technology and of a present invention example.

In the first example described above, analysis models were created for the box-shaped structural members in which the edge of the first hat-shaped cross-section member, the edge of the second hat-shaped cross-section member, and the flat plate were overlapped with each other and intermittently joined together by the plural spot welds, and these analysis models were then analyzed using FEM simulation. By contrast, in a second example, as illustrated in FIG. 42, a physical model was created of a box-shaped structural member in which the edge of a first hat-shaped cross-section member 81 and the edge of a second hat-shaped cross-section member 82, and a third member 83 were overlapped with each other and intermittently joined together by plural joining parts 15. A box-shaped structural member 42 corresponds to a comparative example (conventional technology), and a box-shaped structural member 52 corresponds to a present invention example.

As illustrated in FIG. 42, in the box-shaped structural member 42 according to the comparative example (conventional technology), the third member 83 is configured by a flat plate. Namely, in the box-shaped structural member 42 according to the comparative example (conventional technology), the third member 83 does not include a fold-back portion. On the other hand, in the box-shaped structural member 52 according to the present invention example, the third member 83 is configured including a fold-back structure 130. The fold-back structure 130 is configured by a fold-back portion 131, an opposing portion 133, and a coupling portion 135 coupling the fold-back portion 131 and the opposing portion 133 together. Note that the third member 83 is originally envisaged as being an outer panel, in a structure envisaged such that the third member 83 covers one side (an outer side) of an automotive component 2 as in the case of the outer panel 23 illustrated in FIG. 30B. However, for the present test, in the interest of structure simplification, the third member 83 is only provided at the edge (flange) of the first hat-shaped cross-section member 81 and the edge (flange) of the second hat-shaped cross-section member 82, as illustrated in FIG. 42.

The tensile strengths of the first hat-shaped cross-section member 81 and the second hat-shaped cross-section member 82 were set to that of 2 GPa grade hot stamped sheet steel (with a sheet thickness of 1.6 mm). The tensile strength of the third member 83 was set to that of 270 MPa grade plated GA (with a sheet thickness of 0.7 mm). The plural joining parts 15 were configured by spot welds formed at a pitch of 50 mm.

The joining parts 15 were formed by spot welding under conditions to achieve a nugget diameter of at least $4\sqrt{t}$ (t: 0.7 mm)=3.3 mm between the third member 83 and the first hat-shaped cross-section member 81, and between the third member 83 and the second hat-shaped cross-section member 82. When this was performed, the nugget diameter between the first hat-shaped cross-section member 81 and the second hat-shaped cross-section member 82 was at least $4.5\sqrt{t}$ (t: 1.6 mm)=5.7 mm.

In the box-shaped structural member 52 of the present invention example, the edge of the first hat-shaped cross-section member 81, the edge of the second hat-shaped cross-section member 82, the fold-back portion 131, and the opposing portion 133 were spot welded by four-layer lap welding, and in the box-shaped structural member 42 of the comparative example, the edge of the first hat-shaped cross-section member 81, the edge of the second hat-shaped cross-section member 82, and the flat plate shaped third member 83 were spot welded by three-layer lap welding.

Figure 43:
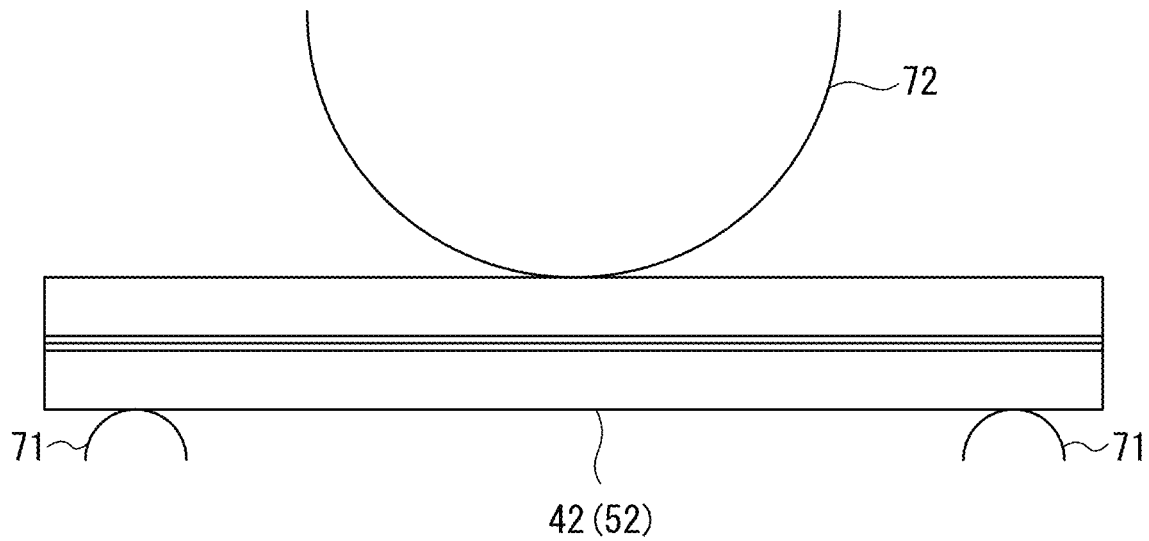
FIG. 43 is a diagram to explain a three-point bending method applied to a box-shaped structural member.
Figure 44:
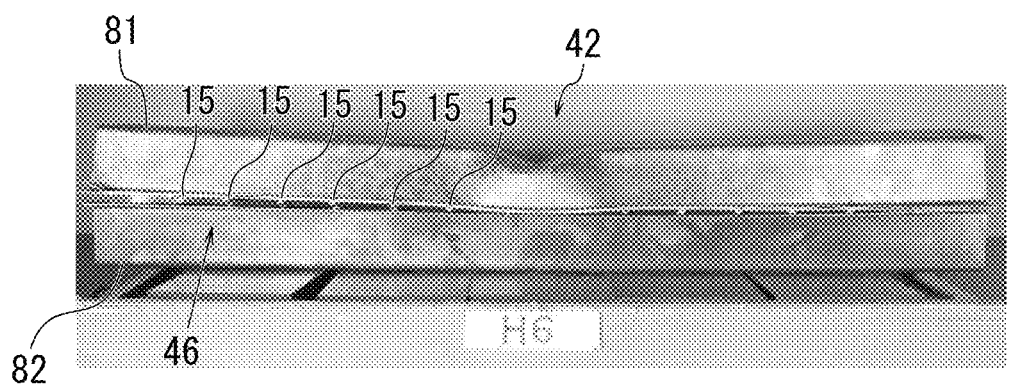
FIG. 44 is a photograph illustrating a state of a box-shaped structural member of a comparative example (conventional technology) following three-point bending.
Figure 45:
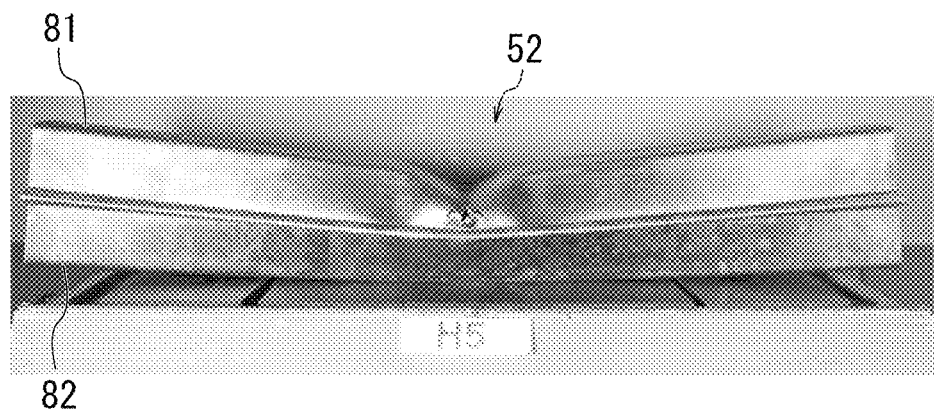
FIG. 45 is a photograph illustrating a state of a box-shaped structural member of a present invention example following three-point bending.

Next, the box-shaped structural members 42, 52 were tested by applying three-point bending using a pair of supports 71 and an impactor 72, as illustrated in FIG. 43. FIG. 44 and FIG. 45 are photographs depicting the box-shaped structural member 52 of the present invention example and the box-shaped structural member 42 of the comparative example (conventional technology) following application of three-point bending to the same impactor displacement amount (100 mm). FIG. 44 illustrates the comparative example (conventional technology), and FIG. 45 illustrates the present invention example.

Figure 46:
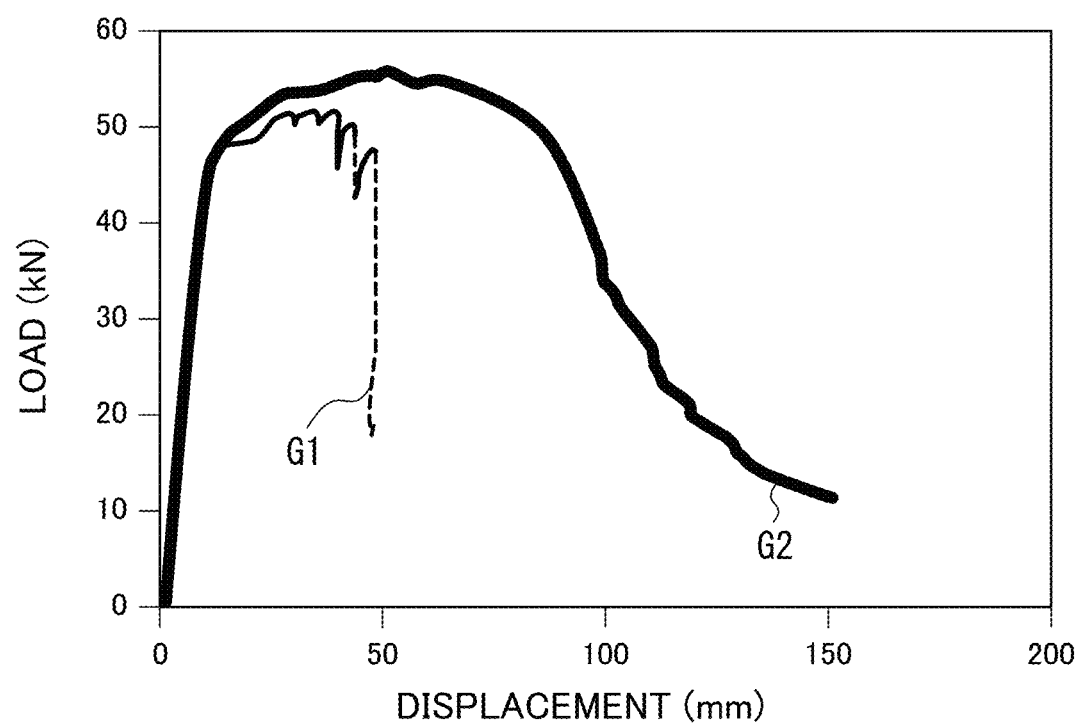
FIG. 46 is a graph (load-displacement graph) comparing relationships between load induced by an impactor and impactor displacement amount for a comparative example (conventional technology) and a present invention example.

FIG. 46 is a graph illustrating a measured relationship between load induced by an impactor and impactor displacement (a load-displacement graph). Graph G1 represents the comparative example (conventional technology), and graph G2 represents the present invention example.

As illustrated in FIG. 44, in the box-shaped structural member 42 of the comparative example (conventional technology), the joining parts 15 fractured and an opening 46 occurred between the first hat-shaped cross-section member 81 and the second hat-shaped cross-section member 82, and the joining parts 15 fractured in the vicinity of the opening 46. On the other hand, as illustrated in FIG. 45, in the box-shaped structural member 52 of the present invention example, such an opening between the first hat-shaped cross-section member 81 and the second hat-shaped cross-section member 82 was suppressed, and fracturing of the joining parts 15 (see FIG. 42) was also suppressed.

As illustrated by graph G1 in FIG. 46, the load-displacement of the box-shaped structural member of the comparative example (conventional technology) exhibited a sudden drop in load when the impactor displacement reached approximately 50 mm. This is due to an opening occurring between the first hat-shaped cross-section member 81 and the second hat-shaped cross-section member 82 when the impactor displacement reached approximately 50 mm, and the joining parts 15 (see FIG. 42) fracturing in the vicinity of the opening.

On the other hand, as illustrated by graph G2, in the present invention example, high load could be maintained when the impactor displacement was approximately 50 mm to approximately 80 mm. Moreover, in the present invention example, a higher maximum load could be achieved than in the comparative example (conventional technology). This is conjectured to be due to the occurrence of openings between the first hat-shaped cross-section member 81 and the second hat-shaped cross-section member 82 when the impactor displacement reached approximately 50 mm to approximately 80 mm being suppressed, and fracturing of the joining parts 15 (see FIG. 42) also being suppressed. Since fracturing of the joining parts 15 was suppressed in the present invention example, a high load state could be maintained, and the maximum load could be improved.

Note that in this second example, there was no significant difference between the load-displacement graphs of the comparative example (conventional technology) and the present invention example until the first occurrence of fracturing of the joining parts 15 of the box-shaped structural member 42 of the comparative example (conventional technology).

INDUSTRIAL APPLICABILITY

The present invention is capable of providing a joint structure that is not liable to fracture at a joining part. In particular, the present invention is capable of improving the performance of members by preventing fracturing of a joint structure configured by high-strength sheet steel which may have lowered toughness due to welding. The present invention accordingly has high potential for industrial utilization.

EXPLANATION OF THE REFERENCE NUMERALS 1 joint structure
2 automotive component
3 electrode
4 vehicle body 11 first sheet member
12 second sheet member
13 third sheet member
14 fourth sheet member
15 joining part
16 additional joining part
17 adhesive
18 notch
21 first structural member (example of first sheet member)
22 second structural member (example of second sheet member)
23 outer panel (example of third sheet member)
25 joining part
52 box-shaped structural member
61 flat plate (example of first sheet member)
62 first hat-shaped cross-section member (example of second sheet member)
63 second hat-shaped cross-section member (example of third sheet member)
81 first hat-shaped cross-section member
82 second hat-shaped cross-section member
83 third member
131 fold-back portion
131A fold-back tab
132 notch
133 opposing portion
135 coupling portion
140 roller
231 fold-back portion

The invention claimed is:

1. A joint structure comprising:
a first sheet member;
a second sheet member overlapped with the first sheet member in a sheet thickness direction;
a third sheet member overlapped in the sheet thickness direction on an opposite side of the second sheet member from a side overlapped with the first sheet member; and
a plurality of joining parts formed at locations where the first sheet member, the second sheet member, and the third sheet member overlap, so as to join the first sheet member, the second sheet member, and the third sheet member together,
the plurality of joining parts being formed at an interval along an edge of the first sheet member and an edge of the second sheet member, and
the third sheet member including a fold-back portion provided at least between the plurality of joining parts by folding the third sheet member back around the edge of the first sheet member and the edge of the second sheet member such that the fold-back portion is disposed on an opposite side of the first sheet member from a side overlapped with the second sheet member,
the plurality of joining parts overlap with the fold-back portion as viewed along the sheet thickness direction, and
all of the joining parts, which overlap with the fold-back portion in a single fold-back portion, joining the first sheet member, the second sheet member, and the third sheet member together, without the first sheet member and the fold-back portion of the third sheet member being welded together.

2. The joint structure of claim 1, wherein a sheet thickness of the third sheet member is thinner than a sheet thickness of the first sheet member and a sheet thickness of the second sheet member.

3. The joint structure of claim 1, wherein the plurality of joining parts have joining parts which join the fold-back portion of the third sheet member and the first sheet member together, separately from all the joining parts that overlap the single fold-back portion in the single fold-back portion.

4. The joint structure of claim 1, wherein the plurality of joining parts have joining parts which are disposed at positions offset from a region overlapping the fold-back portion as viewed along the sheet thickness direction, separately from all the joining parts that overlap the single fold-back portion in the single fold-back portion.

5. The joint structure of claim 1, wherein the fold-back portion includes a notch provided between the plurality of joining parts as viewed along the sheet thickness direction.

6. The joint structure of claim 1, further comprising other joining parts, which are formed at a portion at which the first sheet member, the second sheet member and the third sheet member are overlapped and which join the first sheet member, the second sheet member and the third sheet member to each other, the other joining parts being separate from the plurality of joining parts,
wherein the fold-back portion includes a plurality of notches formed at an interval along the edge of the first sheet member and the edge of the second sheet member, and
the other joining parts are respectively positioned at the plurality of notches as viewed along the sheet thickness direction.

7. The joint structure of claim 1, wherein:
the fold-back portion includes a plurality of fold-back tabs formed at an interval along the edge of the first sheet member and the edge of second sheet member; and
part of the edge of the first sheet member and part of the edge of the second sheet member are positioned between the plurality of fold-back tabs.

8. The joint structure of claim 1, wherein the plurality of joining parts are configured by one or more type selected from the group consisting of a mechanical joining means, a friction stir spot welding means, a spot weld, a seam weld, and a laser weld.

9. The joint structure of claim 1, wherein one or more of the first sheet member, the second sheet member, or the third sheet member is configured from sheet steel.

10. The joint structure of claim 1, wherein one or both of the first sheet member or the second sheet member is configured from sheet steel having a tensile strength of 780 MPa or higher.

11. The joint structure of claim 1, wherein the third sheet member is configured from sheet steel or sheet aluminum having a tensile strength of 270 MPa or higher but less than 390 MPa.

12. The joint structure of claim 1, further comprising an additional joining part, wherein:
the third sheet member includes an opposing portion opposing the fold-back portion across the first sheet member and the second sheet member; and
the additional joining part
joins the opposing portion, the second sheet member, and the fold-back portion together but does not join the first sheet member and the second sheet member together, or
joins the opposing portion, the first sheet member, and the fold-back portion together but does not join the first sheet member and the second sheet member together.

13. The joint structure of claim 1, further comprising a fourth sheet member overlapped in the sheet thickness direction with any of the first sheet member, the second sheet member, or the third sheet member, wherein:

the plurality of joining parts are formed at locations where the first sheet member, the second sheet member, the third sheet member, and the fourth sheet member overlap, so as to join the first sheet member, the second sheet member, the third sheet member, and the fourth sheet member together.

14. An automotive component comprising the joint structure of claim 1, wherein:

the first sheet member configures a first structural member;

the second sheet member configures a second structural member overlapped with the first structural member in the sheet thickness direction; and the third sheet member configures an outer panel overlapped in the sheet thickness direction on an opposite side of the second structural member from a side overlapped with the first structural member.

15. The automotive component of claim 14, wherein the outer panel is a cosmetic outer panel configuring a cosmetic exterior of an automobile.

16. The automotive component of claim 14, wherein the automotive component is an A-pillar, a B-pillar, a side sill, a bumper, a front side member, or a roof rail.

17. A joint structure manufacturing method comprising:

overlapping a second sheet member with a first sheet member in a sheet thickness direction, and overlapping a third sheet member in the sheet thickness direction on an opposite side of the second sheet member from a side overlapped with the first sheet member; and forming a plurality of joining parts at an interval along an edge of the first sheet member and an edge of the second sheet member at locations where the first sheet member, the second sheet member, and the third sheet member overlap so as to join the first sheet member, the second sheet member, and the third sheet member together, and forming a fold-back portion at the third sheet member at least between the plurality of joining parts by folding the third sheet member back around the edge of the first sheet member and the edge of the second sheet member such that the fold-back portion is disposed on an opposite side of the first sheet member from a side overlapped with the second sheet member, the plurality of joining parts overlap with the fold-back portion as viewed along the sheet thickness direction, and all of the joining parts, which overlap with the fold-back portion in a single fold-back portion, joining the first sheet member, the second sheet member, and the third sheet member together, without the first sheet member and the fold-back portion of the third sheet member being welded together.

18. The joint structure manufacturing method of claim 17, wherein the fold-back portion is formed by moving a roller along the edge of the first sheet member and the edge of the second sheet member while applying pressure with the roller.

* * * * *